US008638822B2

(12) United States Patent
Wang et al.

(10) Patent No.: US 8,638,822 B2
(45) Date of Patent: Jan. 28, 2014

(54) NETWORK NODE, COMMUNICATION SYSTEM, AND METHOD FOR TRANSMITTING CLOCK PACKET THROUGH TUNNEL

(75) Inventors: Jiangsheng Wang, Shanghai (CN); Zhichang Lai, Bridgewater, NJ (US); Suolin Chang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 21 days.

(21) Appl. No.: 13/216,909

(22) Filed: Aug. 24, 2011

(65) Prior Publication Data

US 2011/0305307 A1    Dec. 15, 2011

Related U.S. Application Data

(63) Continuation of application No. PCT/CN2010/070721, filed on Feb. 24, 2010.

(30) Foreign Application Priority Data

Feb. 24, 2009    (CN) .......................... 2009 1 0118709

(51) Int. Cl.
*H04J 3/06*    (2006.01)
(52) U.S. Cl.
USPC .......................................... 370/503; 375/362
(58) Field of Classification Search
None
See application file for complete search history.

(56) References Cited

U.S. PATENT DOCUMENTS

| 2002/0015396 | A1* | 2/2002 | Jung ........................... 370/338 |
| 2006/0184797 | A1* | 8/2006 | Weis et al. .................... 713/178 |
| 2006/0203851 | A1 | 9/2006 | Eidson |
| 2008/0075217 | A1 | 3/2008 | Ilnicki et al. |

FOREIGN PATENT DOCUMENTS

| CN | 1507206 A | 6/2004 |
| CN | 1791053 A | 6/2006 |
| CN | 101494613 A | 7/2009 |
| WO | WO 2006/003105 A1 | 1/2006 |

OTHER PUBLICATIONS

PTP over MPLS : draft-ronc-ptp-mpls-00 R. Cohen IETF Jun. 2007.*
IEEE standard for a precision clock synchronization protocol for networked measurement and control systmes IEEE instrumentation and measurement society Jul. 2008.*

(Continued)

*Primary Examiner* — Gregory Sefcheck
*Assistant Examiner* — Rina Pancholi
(74) *Attorney, Agent, or Firm* — Brinks Hofer Gilson & Lione

(57) ABSTRACT

A network node, a communication system, and a method for transmitting a clock packet through a tunnel are disclosed. The method includes: encapsulating a tunnel ingress clock packet received at an ingress of a tunnel in an encapsulation mode corresponding to the tunnel, and performing clock correction for the encapsulated clock packet; and sending the corrected clock packet to an egress of the tunnel. The network node for processing a clock packet includes an encapsulating module and a sending module. The communication system includes the network node for processing a clock packet, and further includes an intra-tunnel network node and a tunnel egress network node. According to the present invention, a clock packet is re-encapsulated and transmitted through a tunnel. In the subsequent process of transmitting the clock packet transparently, the node itself serves as a clock reference point, and all network nodes do not need to synchronize time absolutely.

11 Claims, 17 Drawing Sheets

(56) References Cited

OTHER PUBLICATIONS

Written Opinion of the International Searching Authority issued in corresponding PCT Patent Application No. PCT/CN2010/070721, mailed Jun. 3, 2010.
International Search Report issued in corresponding PCT Patent Application No. PCT/CN2010/070721, mailed Jun. 3, 2010.
Office Action issued in corresponding Chinese Patent Application No. 200910118709.0, mailed Dec. 3, 2010.
IEEE Instrumentation and Measurement Society. "IEEE Standard for a Precision Clock Synchronization Protocol for Networked Measurement and Control Systems", Technical Committee on Sensor Technology (TC-9), IEEE Std 1588TM-2008. Mar. 27, 2008.
IEEE Instrumentation and Measurement Society. "IEEE Standard for a Precision Clock Synchronization Protocol for Networked Measurement and Control Systems", Technical Committee on Sensor Technology (TC-9), IEEE Std 1588TM-2002. Nov. 8, 2002.
Extended European Search Report issued in corresponding European Patent Application No. 10745819.2, mailed Mar. 2, 2012.
Cohen Resolute Networks Ltd. R, "PTP over MPLS" Jun. 30, 2007. XP015052119.
IEEE Instrumentation and Measurement Society, "IEEE Standard for a Precision Clock Synchronization Protocol for Networked Measurement and Control Systems" IEEE Std 1588, 2008.

\* cited by examiner

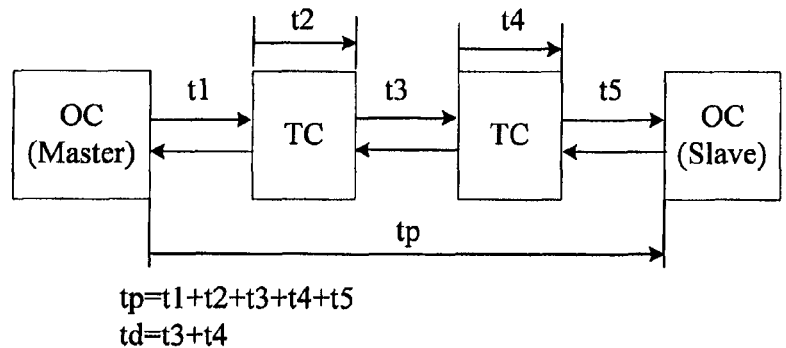
tp=t1+t2+t3+t4+t5
td=t3+t4
FIG. 1A
| TS | Type | r | version | messageLength |
|---|---|---|---|---|
| domainNumber | | reserved | | flagField |
| correctionField (a processing time correction field) ||||||
| reserved ||||||
| sourcePortIdentity ||||||
| | | | | sequenceId |
| controlField || logMessageInterval | | |
| originTimestamp ||||||
FIG. 1B
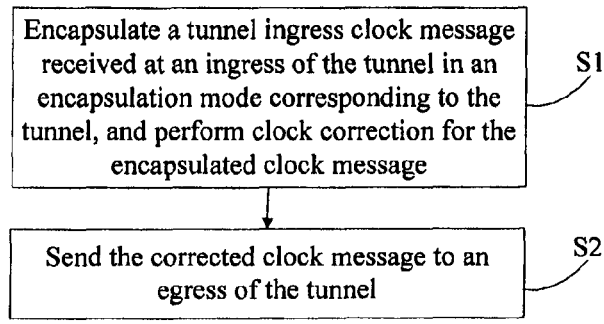
FIG. 2

| byte0 | | byte1 | | byte2 | byte3 |
|---|---|---|---|---|---|
| Version | headerlength | TOS | | Total Length | |
| Identification | | | Flag(3bits) | Fragment Offset (13bits) | |
| TTL | | UDP | | Header Checksum | |
| Source IP@ | | | | | |
| Destination IP@ | | | | | |
| Source Port | | | 319 | | |
| Total Length | | | CRC | | |
| TS | Type | r | version | messageLength | |
| domainNumber | | reserved | | flagField | |
| correctionField (a processing time correction field) | | | | | |
| reserved | | | | | |
| sourcePortIdentity | | | | | |
| | | | | sequenceId | |
| controlField | | logMessageInterval | | | |
| originTimestamp | | | | | |

FIG. 5C

| byte0 | | byte1 | byte2 | byte3 |
|---|---|---|---|---|
| Version | headerlength | TOS | Total Length | |
| Identification | | | Flag(3bits) | Fragment Offset (13bits) |
| TTL | | IP in IP/GRE | Header Checksum | |
| Source IP@ | | | | |
| Destination IP@ | | | | |
| Version | headerlength | TOS | Total Length | |
| Identification | | | Flag(3bits) | Fragment Offset (13bits) |
| TTL | | UDP | Header Checksum | |
| Source IP@ | | | | |
| Destination IP@ | | | | |
| Original clock packet | | | | |

FIG. 5D

NETWORK NODE, COMMUNICATION SYSTEM, AND METHOD FOR TRANSMITTING CLOCK PACKET THROUGH TUNNEL

This application is a continuation of International Application No. PCT/CN2010/070721, filed on Feb. 24, 2010, which claims priority to Chinese Patent Application No. 200910118709.0, filed on Feb. 24, 2009, both of which are hereby incorporated reference in their entireties.

FIELD OF THE INVENTION

The present invention relates to the field of communications, and in particular, to a network node, a communication system, and a method for transmitting a clock packet through a tunnel.

BACKGROUND OF THE INVENTION

As Internet Protocol (IP) technologies are applied to telecom networks, telecom equipment is generally required to support IP transmission. However, a lot of telecom equipment requires high precision of clock synchronization; for example, a time division-code division multiple access (TD-CDMA) system requires a NodeB to provide time precision not lower than ±1.5 µs. Conventional IP networks are based on packet switching and require no high precision of synchronization, and are not competent for IP transmission. Moreover, an IP network imposes no special requirement on the physical layer and the data link layer, and an operating network may be composed of different types of physical networks. In such a network environment (which is composed of packet networks and hybrid networks), the ultimate solution to clock synchronization is the IP-layer clock protocol. Therefore, the IEEE1588 protocol (also known as Precision Time Protocol (PTP)) and the IEEE1588v2 protocol (namely, PTPv2) are developed and are applied widely.

The uncertainty of delay of an IP clock packet on a transmission path is primarily caused by processing (such as queuing, and congestion control) of the network nodes on the path. The core conception of clock synchronization based on IEEE1588v2 is to eliminate delay of processing a clock packet on the transmission path and synchronize clocks. That is, the IEEE1588v2 protocol defines an application scenario of a clock packet, and the clock source and the destination clock parse the clock packet. The time of processing the clock packet by a network node is recorded in a processing time correction field, and the processing time of the clock packet is corrected by correcting the correction field of the clock packet, so that clock synchronization is implemented.

However, the IEEE1588v2 protocol does not take the application scenario that a user datagram protocol/internet protocol (UDP/IP) data packet of the clock packet is transmitted through a tunnel into account.

In the process of implementing the present invention, the inventor finds at least the following problems in the prior art: The clock synchronization is not practicable in the prior art unless the time of a tunnel egress node is absolutely synchronized with the time of a tunnel ingress node when the clock packet is transmitted through a tunnel. In practice, it is hardly practicable to implement absolute time synchronization between the tunnel ingress node and the tunnel egress node, which leads to errors in clock synchronization of the clock packet transmitted through a tunnel.

SUMMARY OF THE INVENTION

Embodiments of the present invention provide a network node, a communication system, and a method for transmitting a clock packet through a tunnel to implement clock synchronization of a clock packet transmitted through the tunnel.

According to one aspect of the present invention, a method for transmitting a clock packet through a tunnel is provided, including: encapsulating a tunnel ingress clock packet received at an ingress of the tunnel in an encapsulation mode corresponding to the tunnel, and performing clock correction for the encapsulated clock packet; and sending the corrected clock packet to an egress of the tunnel.

According to another aspect of the present invention, a network node for processing a clock packet is provided, including: an encapsulating module, configured to encapsulate a received clock packet in an encapsulation mode corresponding to a tunnel if the received clock packet is a tunnel ingress clock packet, and perform clock correction for the encapsulated clock packet; and a sending module, configured to send the clock packet processed by the encapsulating module to an egress of the tunnel.

According to still another aspect of the present invention, a communication system for processing a clock packet is provided, including the foregoing network node for processing a clock packet, and further includes: an intra-tunnel network node, configured to perform clock correction for a received clock packet if the received clock packet is an intra-tunnel clock packet; and a tunnel egress network node, configured to decapsulate the clock packet if the received clock packet is a tunnel egress clock packet, and perform clock correction for the decapsulated clock packet.

The network node, the communication system, and the method for transmitting a clock packet through a tunnel provided in the embodiments of the present invention bring the following benefits:

A clock packet is encapsulated in the encapsulation mode corresponding to the tunnel, the encapsulated clock packet is corrected when the clock packet is transmitted through the tunnel, and not all network nodes need to synchronize time absolutely in the subsequent process. Thereby, when the clock packet is transmitted through the tunnel, clock synchronization is implemented, and the precision of clock synchronization is higher.

BRIEF DESCRIPTION OF THE DRAWINGS

To make the technical solution of the embodiments of the present invention or the prior art clearer, the following outlines the accompanying drawings involved in the description of the embodiments of the present invention or the prior art. Apparently, the accompanying drawings outlined below are illustrative and not exhaustive, and persons of ordinary skill in the art can derive other drawings from such accompanying drawings without creative efforts.

FIG. 1A is a conceptual diagram illustrating transmission of a clock packet over the IEEE1588v2 protocol;

FIG. 1B shows the format of a clock packet in the IEEE1588v2 protocol.

FIG. 2 is a flowchart of a method for transmitting a clock packet through a tunnel according to an embodiment of the present invention;

FIG. 5C shows the format of a clock packet after UDP encapsulation.

FIG. 5D shows the format of a clock packet after IP tunnel encapsulation.

DETAILED DESCRIPTION OF THE EMBODIMENTS

Figure 3:
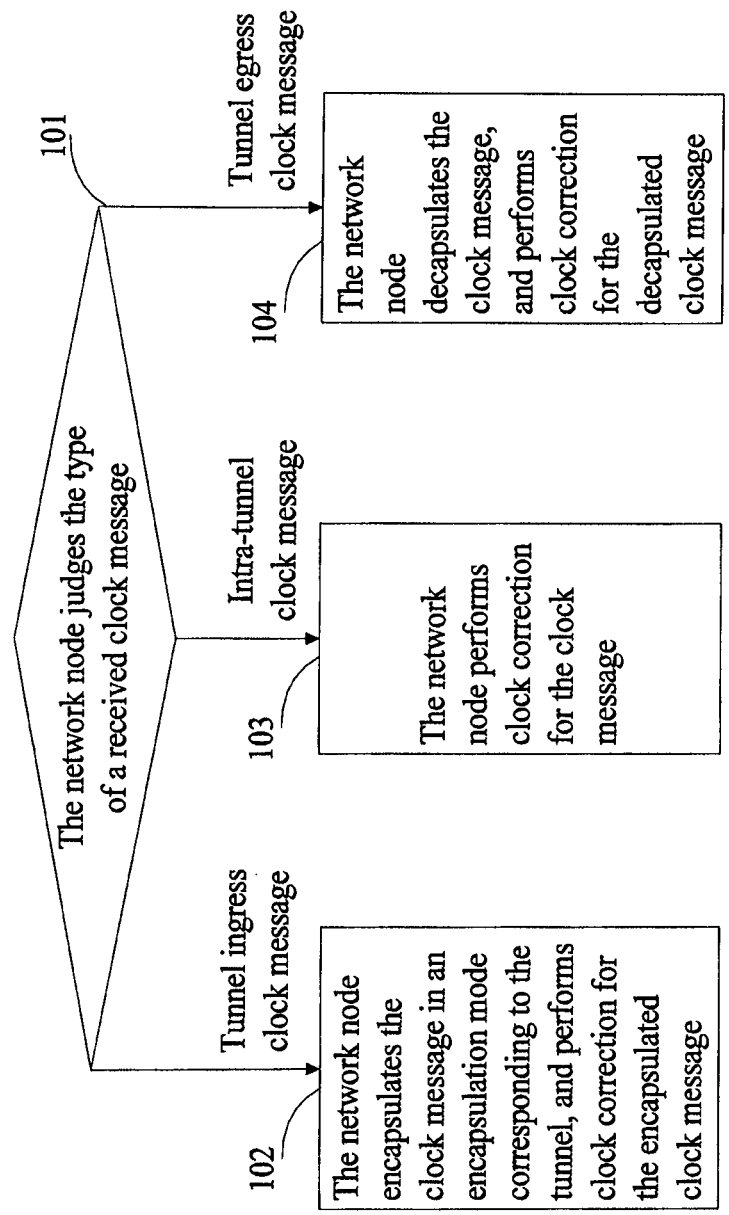
FIG. 3 is a flowchart of a method for transmitting a clock packet through a tunnel according to an embodiment of the present invention.

The technical solution of the embodiments of the present invention is hereinafter described in detail with reference to embodiments and accompanying drawings. Evidently, the embodiments are exemplary only and not exhaustive. All other embodiments, which can be derived by those skilled in the art from the embodiments given herein without creative efforts, shall fall within the protection scope of the present invention.

To make the objectives, technical solution, and merits of the present invention clearer, the following describes the embodiments of the present invention in detail with reference to the accompanying drawings.

FIG. 1A is a conceptual diagram illustrating the transmission of a clock packet over the IEEE1588v2 protocol. In FIG. 1, the master ordinary clock (OC) is generally a high-precision clock capable of providing clock source signals for other network nodes; the slave OC is also known as a child clock or destination clock, which receives data from the master OC, and is synchronized with the master OC; the transparent clocks (TCs) are network nodes that need to be traversed by a clock packet exchanged between the master OC and the slave OC. These network nodes affix a flag of time of processing the clock packet, but process no other contents of the clock packet. The clock packet sent from the master OC network node passes through two TC network nodes and arrives at the slave OC network node. The total delay is $tp=t1+t2+t3+t4+t5$, where t2 and t4 are time spent by the TC network nodes in processing the clock packet, and t1, t3, and t5 are time spent in transmitting the clock packet between the network nodes. The clock packet passes through the TC network nodes on the path, and the time spent by the TC network nodes in processing the clock packet is added to a processing time correction field (correctionField) of the clock packet to correct the time. When a clock packet arrives at the slave OC network node, the slave OC network node grasps the timestamp sent by the master OC, and grasps the time delay of processing on the path ($td=t2+t4$, which may be obtained from the correctionField of the clock packet received by the slave OC network node). In this way, the path delay can be calculated according to the total delay (tp) and the processing delay (td). Assuming that the path is symmetric, the total time (T) spent on the round trip of the packet sent from the master OC and returned to the master OC can be obtained. Therefore, the total time of transmitting the packet from the master OC to the slave OC is $t1+t3+t5=T/2-td$. By adding $t1+t3+t5$, and td to the local time, the slave OC is synchronized with the master OC.

The format of a clock packet (such as a Sync clock) in the IEEE1588v2 protocol is as shown in FIG. 1B. When the clock packet passes through a network node, the network node records the processing delay in the correctionField, which is specifically as follows: First, the correctionField is initialized to 0 (or another value); when the clock packet passes through a network node, the network node parses the correctionField, and adds its processing time to the value of the correctionField (New correctionField=Original correctionField+localProcessingDelay); the clock packet is re-encapsulated, and sent to the next network node. In this way, the slave clock network node can obtain the total processing delay (td) from the correctionField of the clock packet, and perform the foregoing calculation to implement clock synchronization. Therefore, in the solution to transmitting a clock packet through a tunnel (or referred to as the solution that a clock packet traverses a tunnel), the clock can be synchronized through the foregoing calculation method so long as the total processing time spent in transmitting the clock packet through the tunnel is obtained.

FIG. 2 is a flowchart of a method for transmitting a clock packet through a tunnel according to an embodiment of the present invention. The method includes the following steps:

Step S1: Encapsulate a tunnel ingress clock packet received at an ingress of a tunnel in an encapsulation mode corresponding to the tunnel, and perform clock correction for the encapsulated clock packet.

Step S2: Send the corrected clock packet to an egress of the tunnel.

In this embodiment, the clock packet is encapsulated in the encapsulation mode corresponding to the tunnel, the encapsulated clock packet is corrected when the clock packet is transmitted through the tunnel, and not all network nodes need to synchronize time absolutely in the subsequent process. Thereby, when the clock packet is transmitted through the tunnel, clock synchronization is implemented, and the precision of clock synchronization is higher.

FIG. 3 is a flowchart of a method for transmitting a clock packet through a tunnel according to an embodiment of the present invention. The method includes the following steps:

Step 101: The network node judges the type of a received clock packet.

Figure 4:
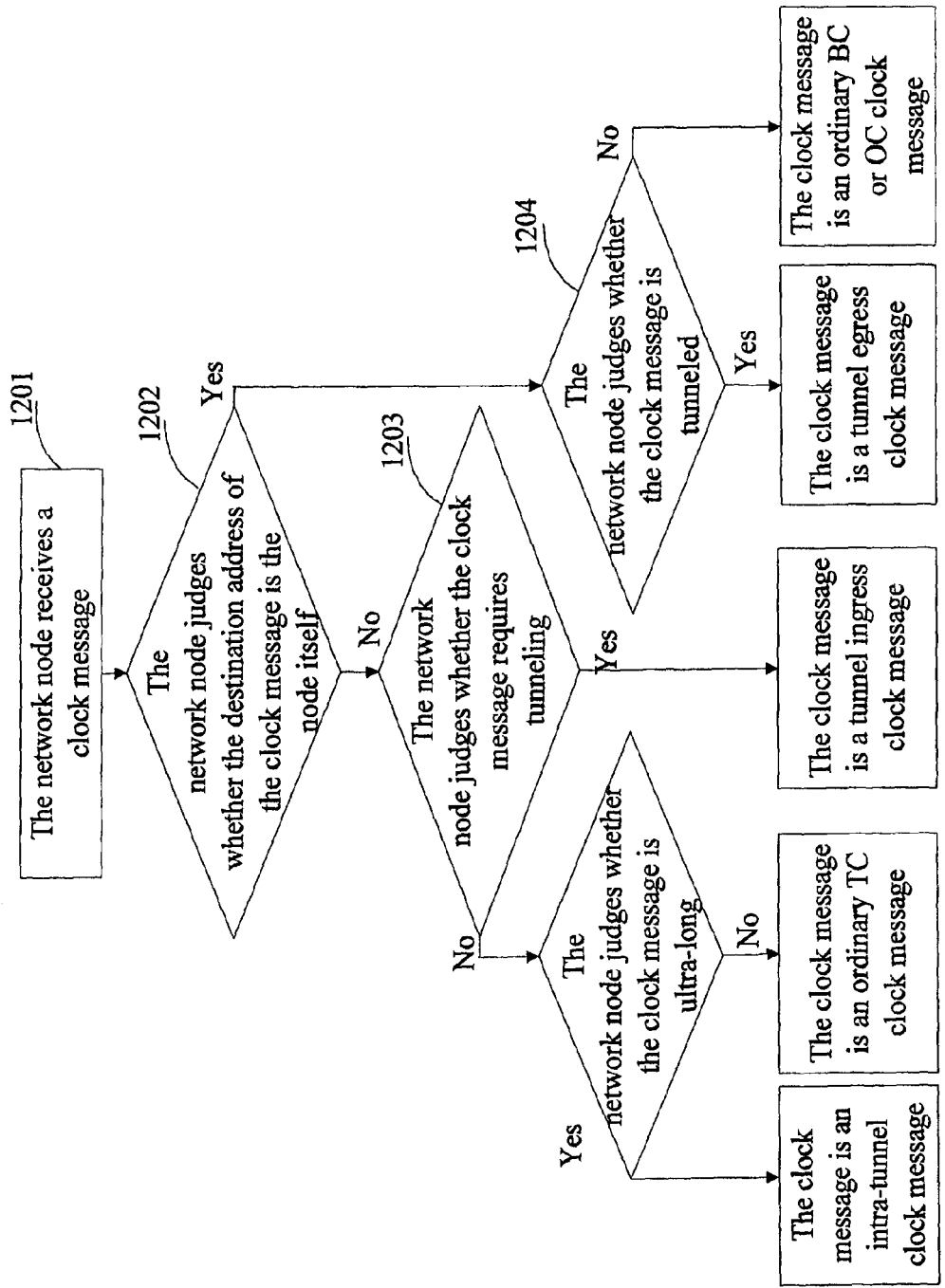
FIG. 4 is a flowchart of a method for judging the type of a clock packet according to an embodiment of the present invention.

As shown in FIG. 4, each network node may play multiple roles simultaneously. That is, for a tunnel ingress clock packet, the network node is a tunnel ingress node; for a tunnel egress clock packet, the network node is a tunnel egress node; for an intra-tunnel clock packet, the network node is an intra-tunnel node. Therefore, when the network node receives a clock packet, the network node judges whether the type of the received clock packet is a tunnel ingress clock packet, or an intra-tunnel clock packet, or a tunnel egress clock packet, and then performs the subsequent operations (step 102, step 103, or step 104) accordingly. The judging method is described below:

Step 1201: The network node receives a clock packet.

Step 1202: The network node judges whether the destination address of the clock packet is the network node itself; and, if the destination address of the clock packet is not the network node itself, the procedure proceeds to step 1203; if the destination address of the clock packet is the network node itself, the procedure proceeds to step 1204.

Step 1203: The network node judges whether the clock packet requires tunneling; if the clock packet requires tunneling, the network node determines that the clock packet is a tunnel ingress clock packet; if the clock packet does not require tunneling, the network node judges whether the clock packet is ultra-long. If the clock packet is ultra-long, the network node determines that the clock packet is an intra-tunnel clock packet; if the clock packet is not ultra-long, the network node determines that the clock packet is an ordinary TC packet, and performs ordinary transparent transmission for the ordinary TC packet according to the IEEE 1588v2 protocol.

If the clock packet does not requires tunneling, the network node may parse the clock packet, and judge whether the "UDP encapsulation+UDP port number 319" feature is identifiable in the inner layer of the clock packet. In this way, the network node knows whether the clock packet is an intra-tunnel clock packet or ordinary TC packet. If the parsing result shows that the "UDP encapsulation+UDP port number 319" feature is identified in the inner layer of the clock packet, the clock packet is an intra-tunnel clock packet; if the parsing result shows that the "UDP encapsulation+UDP port number 319" feature is not identified in the inner layer of the clock packet, the clock packet is an ordinary TC packet. The method for identifying the intra-tunnel clock packet is not limited to the two methods described above.

Specifically, the above step of judging whether the clock packet requires tunneling in step 1203 includes: interacting with a tunnel processing module in this node, and judging, according to the source address and the destination address of the clock packet, whether the clock packet requires tunneling. If the clock packet requires tunneling, this step further includes: obtaining, from the tunnel processing module, the source address and the destination address of the tunnel.

The step of judging whether the clock packet is ultra-long in step 1203 includes: judging whether the clock packet exceeds the length of the clock packet specified in the IEEE1588v2 protocol. For example, the IEEE1588v2 protocol specifies that the length of a Sync packet or a Delay_Req packet is 44 bytes (exclusive of the UDP header).

Step 1204: The network node judges whether the clock packet is a tunneled packet; if the clock packet is a tunneled packet, the network node determines that the clock packet is a tunnel egress clock packet; if the clock packet is not a tunneled packet, the network node determines that the clock packet is an ordinary boundary clock (BC) packet or an OC packet, and performs ordinary BC processing or OC processing for the packet according to the IEEE1588v2 protocol.

For an IP-in-IP tunnel (the former "IP" represents the inner-layer protocol number such as IPv4 and IPv6, and the latter "IP" represents an IP tunnel), the step of judging whether the clock packet is tunneled in step 1204 may include: if the UDP port of the clock packet specifies that the packet is an IEEE1588v2 clock packet, the length of the clock packet exceeds the length of a standard IEEE1588v2 clock packet specified in the IEEE1588v2 protocol, and the tail of the clock packet shows an identifier of an "IP/UDP/PTP" packet (namely, the "IPversion" field is v4 or v6, the UDP protocol number field is 768, and the UDP port is 319), determining that the clock packet is a tunneled packet; otherwise, determining that the clock packet is not a tunneled packet.

For an ETH-in-IP tunnel ("ETH" represents the inner-layer protocol number, namely, a clock packet of Ethernet protocol, and "IP" represents an IP tunnel), the step of judging whether the clock packet is tunneled in step 1204 may include: if the UDP port of the clock packet specifies that the packet is an IEEE1588v2 clock packet, the length of the clock packet exceeds the length of a standard IEEE1588v2 clock packet specified in the IEEE 1588v2 protocol, and the value of the "type" field in the Ethernet header at the tail of the clock packet is "0x88F7", determining that the clock packet is a tunneled packet; otherwise, determining that the clock packet is not a tunneled packet.

Step 102: If the received clock packet is a tunnel ingress clock packet, the network node encapsulates the received clock packet in an encapsulation mode corresponding to the tunnel, and performs clock correction for the encapsulated clock packet.

The encapsulation mode corresponding to the tunnel refers to the mode identifiable by the tunnel. For example, when the tunnel is an IP tunnel, the encapsulation mode corresponding to the tunnel refers to UDP encapsulation for the received clock packet; when the tunnel is a Mutiprotocol Label Switching (MPLS) tunnel, the encapsulation mode corresponding to the tunnel refers to MPLS encapsulation for the received clock packet; when the tunnel is an ETH tunnel, the encapsulation mode corresponding to the tunnel refers to Generic Routing Encapsulation (GRE) for the received clock packet. The embodiments of the present invention are not limited to the three kinds of tunnels and the corresponding encapsulation modes above.

Specifically, the clock packet may include a processing time correction field of the clock packet, and the clock packet may be transmitted through a single-layer tunnel or through a multi-layer tunnel. Accordingly, the step of encapsulating the clock packet in the encapsulation mode corresponding to the tunnel may include: setting an initial value of the outermost processing time correction field of the clock packet, generating a new clock packet, appending the original clock packet to the new clock packet, and encapsulating the new clock packet in the encapsulation mode corresponding to the tunnel.

This step is detailed below, assuming that the clock packet is transmitted through an IP tunnel: If the received clock packet is a tunnel ingress clock packet, the network node performs UDP encapsulation for the received clock packet, corrects the processing time correction field of the encapsulated clock packet, and sends the corrected clock packet to the tunnel for transmission. The step of sending the corrected clock packet to the tunnel for transmission may include:

performing tunnel encapsulation for the clock packet sent to the tunnel, for example, if the clock packet is transmitted through an IP tunnel, adding an IP header at the front part of the clock packet to implement tunnel encapsulation so that the packet can go through the tunnel normally.

The clock correction for the encapsulated clock packet refers to: adding the processing time of the clock packet to the processing time correction field of the clock packet; the processing time of the clock packet refers to: the time spent by the network node in processing the clock packet in the period from receiving the clock packet to sending the clock packet; for example, the processing time includes time spent in transmitting the clock packet transparently according to an IEEE1588v2 protocol, time spent in encapsulating the clock packet in the mode identifiable by the tunnel, and time spent in tunnel encapsulation.

Step 103: The network node performs clock correction for the clock packet if the received clock packet is an intra-tunnel clock packet.

The clock correction for the clock packet refers to: adding the processing time of the clock packet to the processing time correction field of the clock packet, where the processing time includes the time of transmitting the clock packet transparently.

For a TC network node in the existing communication network, if the processing of an ultra-long packet is supported, the correction field does not need to be modified, and is directly applicable to step 103, in which the clock packet undergoes clock correction. In this case, the TC network node in the existing communication network needs to fulfill the following conditions: (1) The processing by the network node is not limited to processing a length-invariant clock packet, namely, the network node does not detect the length of a packet; (2) no limitation on the length of a clock packet processed by the network node is made, and the network node makes no modification or processing for fields other than the "processing time correction field"; (3) for an IPv4 tunnel, the check bit in the UDP header is set to 0; and (4) for an IPv6 tunnel, the check calculation of the clock packet is not intended for a length-invariant clock packet only, but for all packets including a length-variable clock packet.

If the TC network node in the existing communication network does not fulfill one of the foregoing conditions, the TC network node may be upgraded so that the method described in step 103 is applicable.

Therefore, the method in this embodiment involves few modifications to the existing communication network and is easy to implement.

Step 104: The network node decapsulates the clock packet if the received clock packet is a tunnel egress clock packet, and performs clock correction for the decapsulated clock packet.

Specifically, the clock packet includes a processing time correction field of the clock packet, and the clock packet may be transmitted through a single-layer tunnel or through a multi-layer tunnel. Therefore, the step of encapsulating the clock packet in the mode corresponding to the tunnel includes: setting an initial value of the outermost processing time correction field of the clock packet, generating a new clock packet, appending the original clock packet to the new clock packet, and re-encapsulating the clock packet in the encapsulation mode corresponding to the tunnel. Accordingly, the decapsulation of the clock packet may be: decapsulating the clock packet, stripping off the new clock packet, subtracting the initial value of the outermost processing time correction field from the value of the outermost processing time correction field of the non-decapsulated clock packet, and adding the result of the subtraction to the processing time correction field of the decapsulated clock packet.

If the initial value of the outermost processing time correction field is set at the ingress of the tunnel by using the value in the outermost processing time correction field as the initial value directly, and, if the clock correction for the intra-tunnel clock packet is an operation of correcting the outermost processing time correction field of the intra-tunnel clock packet, the decapsulation of the clock packet at the egress of the tunnel may be: decapsulating the clock packet, stripping off the new clock packet, and substituting the value of the outermost processing time correction field of the non-decapsulated clock packet into the outermost processing time correction field of the decapsulated clock packet.

Still assuming that the clock packet is transmitted through an IP tunnel, if the received clock packet is a tunnel egress clock packet, the network node performs UDP decapsulation for the received clock packet, corrects the processing time correction field of the decapsulated clock packet, and, optionally, performs tunnel decapsulation for the clock packet, namely, stripping off the IP header of the clock packet.

It can be seen that, in this embodiment, the clock packet is encapsulated in the encapsulation mode corresponding to the tunnel, the encapsulated clock packet is corrected when the clock packet is transmitted through the tunnel, and the clock packet is decapsulated after the clock packet is transmitted out of the tunnel. In this way, the total time spent in transmitting the clock packet through the tunnel is obtained, and the clock synchronization of the clock packet transmitted in the tunnel is implemented through calculation. Meanwhile, each network node on the tunnel uses itself as a clock reference point when correcting the processing time correction field of the encapsulated clock packet, and not all network nodes need to synchronize time absolutely, which achieves higher precision of clock synchronization of the clock packet transmitted through the tunnel.

The foregoing method for transmitting a clock packet through a tunnel is not only applicable to the scenario of transmitting a clock packet through a single-layer tunnel, but also applicable to the scenario of transmitting a clock packet through a multi-layer tunnel where at least two tunnel ingress nodes and at least two tunnel egress nodes corresponding to the at least two tunnel ingress nodes exist. When a clock packet is transmitted through a multi-layer tunnel, the processing time correction field of the clock packet at the ingress and egress of the tunnel at each layer may be corrected by adding the value of the correction field in the clock packet layer by layer, or by substituting the value of the correction field in the clock packet layer by layer, or by other means.

In the method of adding the value of the correction field in the clock packet layer by layer, the time of processing the clock packet in the tunnel at each layer may be calculated independently; the step of encapsulating the clock packet in the encapsulation mode corresponding to the tunnel at the ingress of the tunnel at each layer includes: setting an initial value of the outermost processing time correction field of the received clock packet to 0 or another value, generating a new clock packet, appending the original clock packet (namely, the received clock packet) to the new clock packet, and re-encapsulating the new clock packet in the encapsulation mode corresponding to the tunnel; accordingly, the clock correction performed by an intra-tunnel network node for the intra-tunnel clock packet includes: adding the processing time of the intra-tunnel clock packet to the processing time correction field at any layer of the intra-tunnel clock packet; the step of decapsulating the clock packet at the egress of the tunnel at each layer may include: decapsulating the clock packet received at the egress of the tunnel, stripping off the preceding new clock packet, subtracting the initial value of the outermost processing time correction field from the value of the outermost processing time correction field of the non-decapsulated clock packet, and adding the result of the subtraction to the processing time correction field of the decapsulated clock packet. In this step, the value in the outermost processing time correction field of the non-decapsulated clock packet may be added to the processing time correction field at any layer of the decapsulated clock packet. Because the value of the outermost processing time correction field of the non-decapsulated clock packet is summated at the egress of the tunnel at each layer, the value of the processing time correction field of the clock packet transmitted out of the outermost tunnel is the sum of the processing time of the clock packet transmitted through all tunnels.

In the method of substituting the value of the correction field in the clock packet layer by layer, the step of encapsulating the clock packet in the encapsulation mode corresponding to the tunnel at the ingress of the tunnel at each layer includes: generating a new clock packet by using the value of the outermost processing time correction field of the clock packet as an initial value, appending the original clock packet to the new clock packet, and re-encapsulating the new clock packet in the encapsulation mode corresponding to the tunnel; accordingly, the clock correction performed by an intra-tunnel network node for the intra-tunnel clock packet includes: adding the processing time of the intra-tunnel clock packet to the outermost processing time correction field of the intra-tunnel clock packet; the step of decapsulating the clock packet at the egress of the tunnel at each layer may include: at the egress of the tunnel at each layer, decapsulating the clock packet, stripping off the new clock packet, and substituting the value of the outermost processing time correction field of the non-decapsulated clock packet into the outermost processing time correction field of the decapsulated clock packet. In this step, the value in the outermost processing time correction field of the non-encapsulated clock packet is substituted into the outermost processing time correction field of the encapsulated clock packet when the clock packet is encapsulated at the ingress of the tunnel at each layer, and the value in the outermost processing time correction field of the non-decapsulated clock packet is substituted into the outermost processing time correction field of the decapsulated clock packet at the egress of the tunnel at each layer. Therefore, the value of the processing time correction field of the clock packet transmitted out of the outermost tunnel is the sum of the processing time of the clock packet transmitted through all tunnels.

When the clock packet is transmitted through a single-layer tunnel, the encapsulation of the packet at the ingress of the tunnel, the correction inside the tunnel, and the decapsulation at the egress of the tunnel described above are also applicable.

It can be seen that, this embodiment also implements clock synchronization of the clock packet transmitted through a multi-layer tunnel.

To further improve clock precision, this method may include an additional step of frequency correction based on the IEEE1588v2 protocol.

In this embodiment, the clock packet may be an IEEE1588v2 clock packet; and the network node may be a server, a switch, a router, or a radio base station.

In this embodiment of the present invention, the clock packet may be but not limited to: IP clock packet, Ethernet (ETH) clock packet, or MPLS clock packet; and the tunnel may be but not limited to: IP tunnel, ETH tunnel, MPLS tunnel, and IPSec tunnel.

The method for transmitting a clock packet through a tunnel in this embodiment of the present invention is applicable to both homogeneous networks and heterogeneous networks.

The method for transmitting a clock packet through a tunnel in this embodiment of the present invention is applicable to both the scenario of transmitting a clock packet through an existing tunnel and the scenario of transmitting a clock packet through a tunnel dedicated to the clock packet.

Figure 5A:
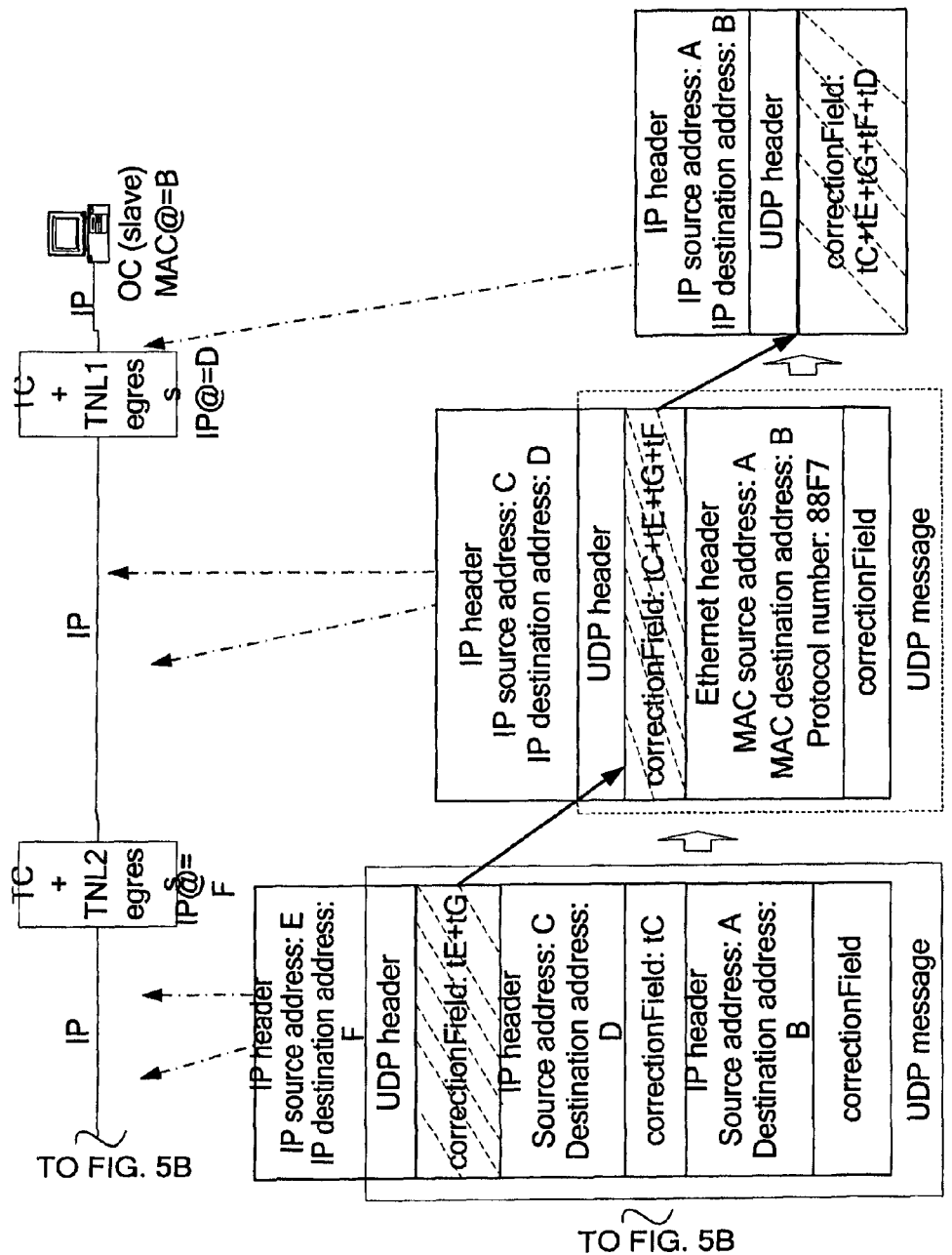
FIG. 5A and FIG. 5B show a schematic diagram of a method for transmitting an IP clock packet through a two-layer IP tunnel by adding the value of the correction field in the clock packet layer by layer according to an embodiment of the present invention.
Figure 5B:
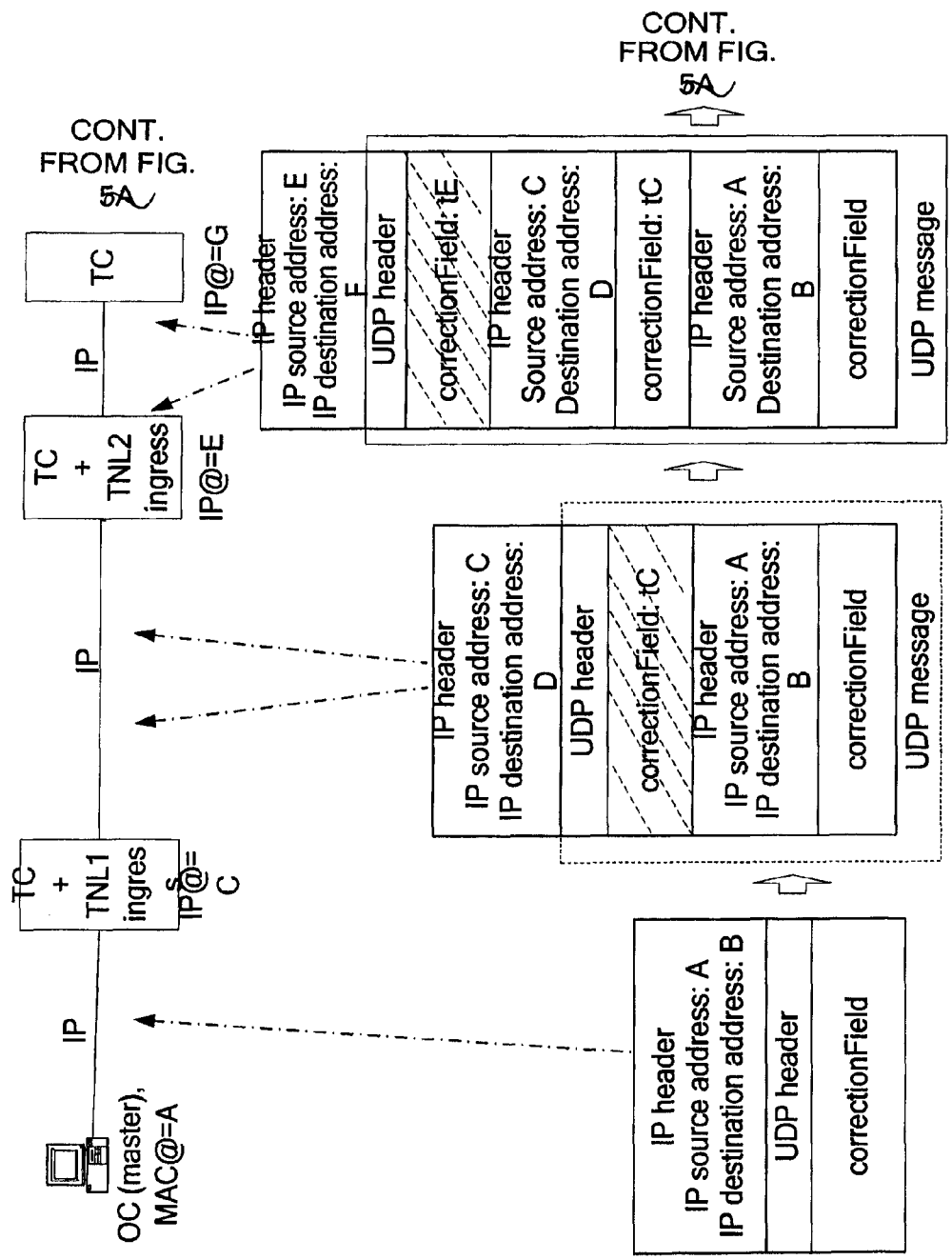

FIG. 5A and FIG. 5B show a schematic diagram of a method for transmitting an IP clock packet through a two-layer IP tunnel according to an embodiment of the present invention.

In the prior art, when an IEEE 588v2 clock packet is applied in an IP network, the UDP encapsulation mode is applied. The format of a clock packet after UDP encapsulation is as shown in FIG. 5C. When the clock packet passes through the network node in the IP network, the network node recognizes the "UDP encapsulation+UDP port number 319", and performs clock correction for the clock packet, namely, adds the time spent by the network node in transmitting the clock packet transparently to the processing time correction field.

In the prior art, when an IEEE1588v2 clock packet is transmitted through an IP tunnel, the clock packet undergoes tunnel encapsulation, namely, an IP header is added to the outer layer of the packet. As shown in FIG. 5D, if the clock packet is transmitted transparently without tunnel encapsulation, the clock packet is unable to go through the IP tunnel to the opposite end correctly. In the process of implementing the present invention, the inventor finds at least the following problems in the prior art: Because an outer-layer IP header is added when the clock packet enters the IP tunnel, the clock packet is identified as "IP-in-IP tunnel" instead of "UDP encapsulation+UDP port number 319" at the header; consequently, the network node on the IP tunnel traversed by the clock packet is incapable of identifying the clock packet correctly, and is incapable of correcting the processing time correction field; the time correction occurs on both ends of the tunnel only, and noticeable clock errors occur in the tunnel which lacks clock correction.

In this embodiment, when the IP clock packet is transmitted through an IP tunnel, the clock packet is re-encapsulated in a way that the clock packet is encapsulated into a UDP packet; therefore, clock correction is performed for the clock packet throughout the IP tunnel, and the clock synchronization of the clock packet transmitted in the IP tunnel is implemented.

In this embodiment, network nodes A, B, C, D, E, F, and G are servers distributed in the network; the method of adding the value of the correction field in the clock packet layer by layer is applied, and the initial value of the processing time correction field of the clock packet at the ingress of the tunnel at each layer is 0.

Network node A, namely, master OC (IP@:A), sends an IEEE1588v2 clock packet such as a Sync packet in an End-to-End (E2E) scenario to network node B, namely, slave OC (IP@:B). This clock packet needs to pass through two IP tunnels: TNL1 (network node C→network node D), and TNL2 (network node E→network node F). The Delay Request in the return trip is processed similarly. The shadow part in FIG. 5A and FIG. 5B indicates the "processing time correction field" to be processed by each network node. Node C (IP@:C) at the ingress of TNL1 encapsulates the original IP clock packet in a way that the original IP clock packet is encapsulated into a UDP packet; node D (IP@:D) at the egress of TNL1 decapsulates the clock packet in a way that the clock packet is decapsulated into a UDP packet, adds the value of the outermost processing time correction field of the non-decapsulated clock packet to the outermost processing time correction field of the decapsulated clock packet, and forwards the clock packet. The clock packet is processed similarly in the other tunnel E→F.

Figure 6A:
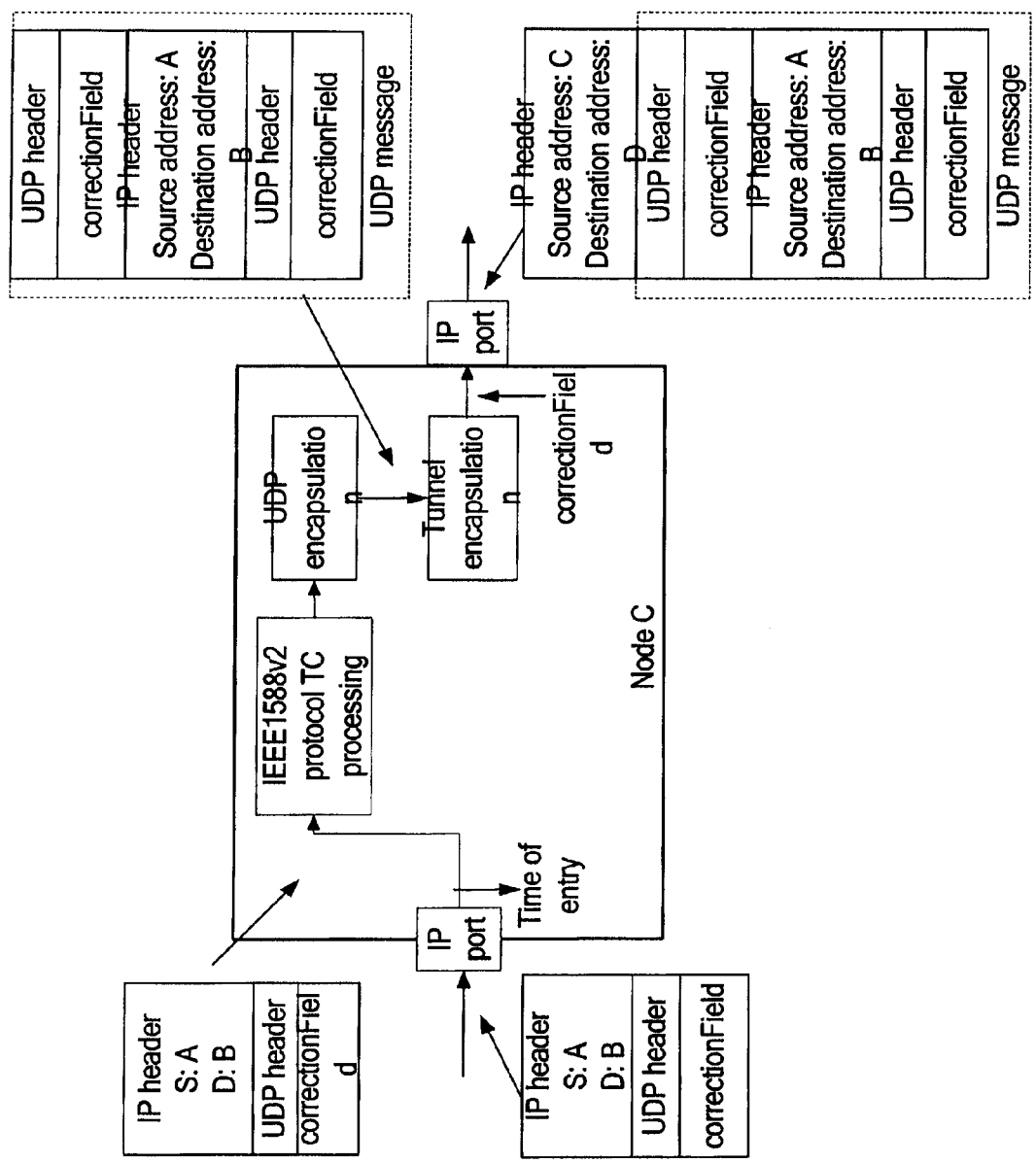
FIG. 6A is a schematic diagram illustrating how a tunnel ingress node processes a clock packet according to an embodiment of the present invention.

As shown in FIG. 6A, after receiving the clock packet, node C at the ingress of TNL1 determines that the destination address of the clock packet is not this network node itself and determines that the clock packet requires tunneling; therefore, node C determines that the clock packet is a tunnel ingress clock packet (namely, node C is a tunnel ingress node), records the time (t1) of the clock packet entering the IP port of the tunnel ingress node C, performs TC processing for the clock packet through the IEEE1588v2 protocol, encapsulates the clock packet in a way that the clock packet is encapsulated into a UDP packet, and sets the UDP port identifier to IEEE1588v2 clock packet. The length of the whole UDP packet is input into the "length" field in the encapsulated clock packet, and the check bit is set to 0, so that a UDP-encapsulated clock packet is obtained. The encapsulated clock packet undergoes IP tunnel encapsulation, namely, an IP header is added to the outer layer of the UDP packet, and the "protocol number (IPv4)" field or "next header (IPv6)" field is set to "IP-in-IP" (the former "IP" is an inner-layer protocol number, and the latter "IP" is the IP tunnel traversed by the packet). When the clock packet arrives at the egress network node C, network node C records the time (t2) spent by node C in processing the clock packet, modifies the outermost processing time correction field (shadow part in FIG. 5A and FIG. 5B) of the UDP-encapsulated clock packet to tC=t2−t1, and sends the corrected clock packet to TNL1 for transmission. The foregoing process may further include the following step: The network node C converts the destination address of the clock packet into the tunnel egress address, and converts the source address into the tunnel ingress address.

Figure 6B:
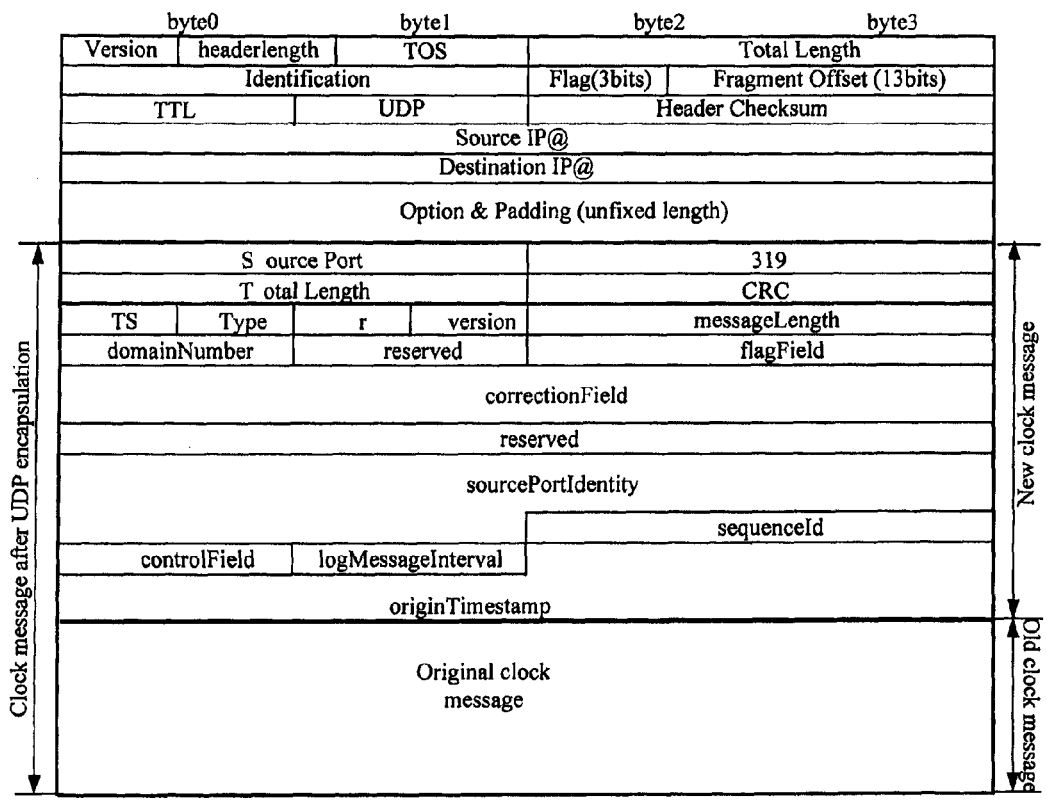
FIG. 6B shows the format of a clock packet after UDP encapsulation.

The encapsulated clock packet includes two parts rather than two clock packets. That is, the length of the encapsulated clock packet is the length of the new clock packet plus the length of the original clock packet (including the IP header), as shown in FIG. 6B. Therefore, because the encapsulation format is "new clock packet"+"original clock packet", the method in this embodiment involves few modifications to the existing clock packet and is easy to implement.

After network node C sends the clock packet encapsulated in a way that the clock packet is encapsulated into a UDP packet from TNL1 to network node E, network node E determines that the received clock packet is a tunnel ingress clock packet, namely, determines that network node E is an ingress node of TNL2. Therefore, network node E re-encapsulates the received clock packet (namely, the clock packet encapsulated by network node C through UDP encapsulation) through UDP encapsulation and corrects the outermost processing time correction field of the re-encapsulated clock packet after UDP encapsulation, namely, modifies the value of the outermost processing time correction field of the re-encapsulated clock packet to tE, and then sends the corrected clock packet to TNL2 for transmission.

Figure 7:
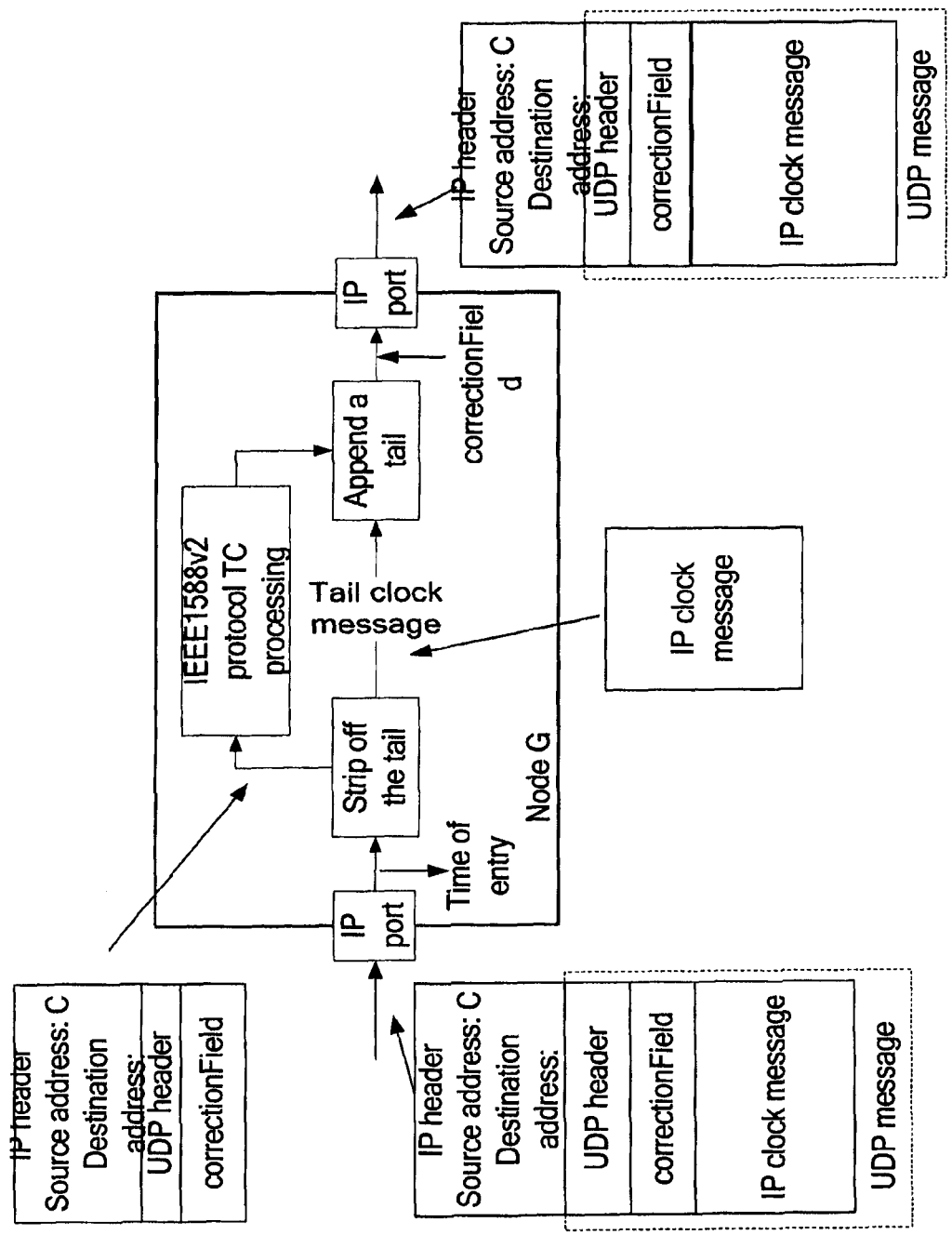
FIG. 7 is a schematic diagram illustrating how an intra-tunnel node processes a clock packet according to an embodiment of the present invention.

As shown in FIG. 7, after receiving the clock packet, intra-tunnel node G determines that the destination address of the clock packet is not this node itself and determines that the clock packet is an ultra-long clock packet which does not require tunneling; therefore, network node G determines that the received clock packet is an intra-tunnel clock packet (namely, network node G is an IP intra-tunnel node), and corrects the outermost clock correction field, without modifying the original clock packet encapsulated. After the clock packet enters the IP port of network node G, network node G records the time (t3) of entering network node G, and strips off the tail of the received clock packet. Network node G performs TC processing according to the IEEE 588v2 protocol for the clock packet without the tail (namely, the new clock packet), appends the tail packet to the packet that has undergone the TC processing, and records the time (t4) of the clock packet leaving network node G. Therefore, the time spent by network node G in processing the clock packet is tG=t4−t3. Network node G adds tG to the outermost processing time correction field tE of the clock packet so that the value of the outermost processing time correction field of the clock packet is tE+tG. The clock packet is output from the IP port of network node G, and is further transmitted in the tunnel.

Figure 8:
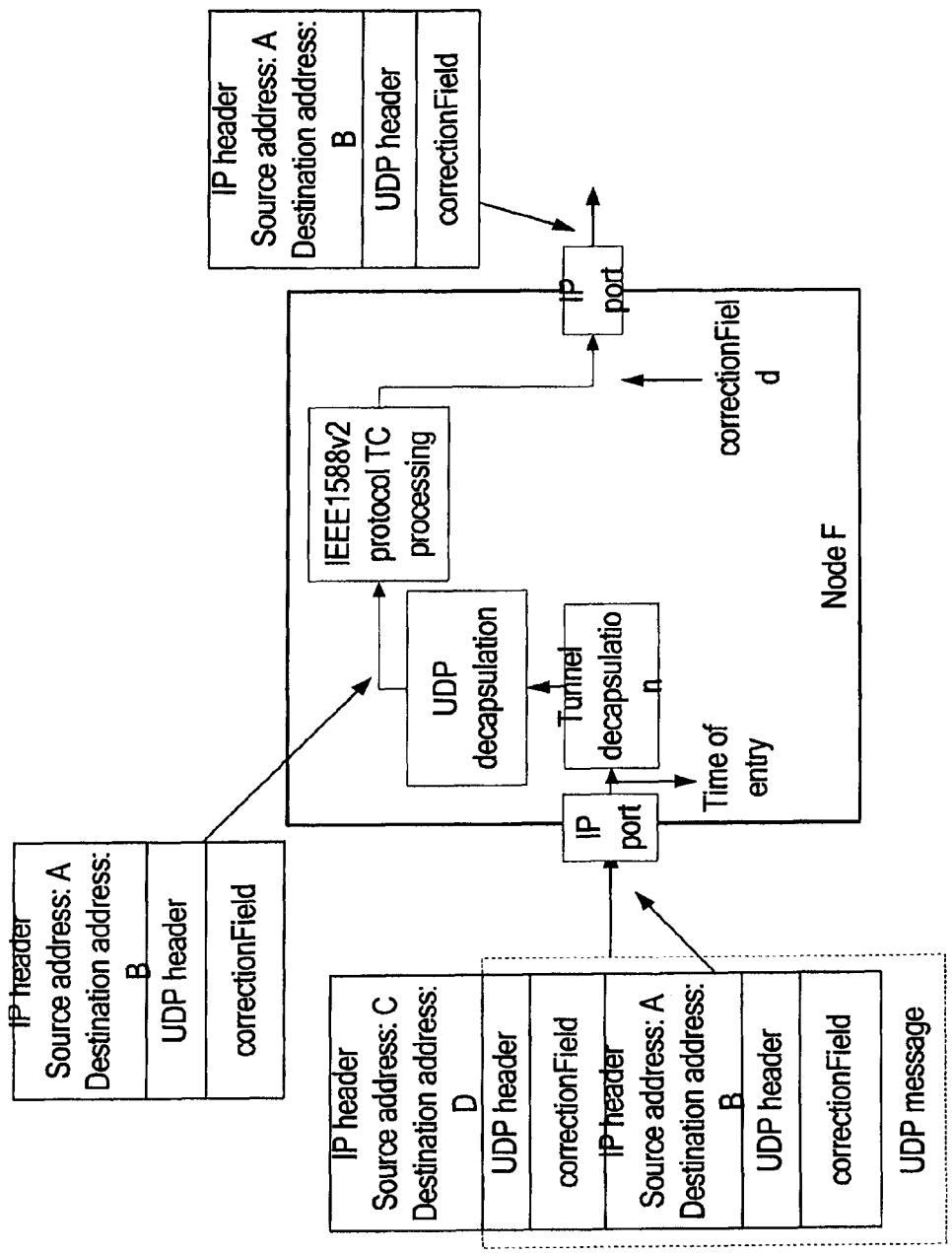
FIG. 8 is a schematic diagram illustrating how a tunnel egress node processes a clock packet according to an embodiment of the present invention.

As shown in FIG. 8, after receiving the clock packet, network node F determines that the destination address of the clock packet is the network node itself and determines that the clock packet is tunneled; therefore, network node F knows that the clock packet is a tunnel egress clock packet, namely, network node F is a tunnel egress node. After the clock packet is transmitted from TNL2 to node F at the egress of TNL2, network node F records the time (t5) of the clock packet entering the node F from the IP port, performs the tunnel decapsulation (namely strips off the outermost IP header), strips off the preceding new clock packet, and adds the value (tE+tG) of the outermost processing time correction field of the non-decapsulated clock packet to the processing time correction field of the decapsulated clock packet (because the initial value of the processing time correction field is set to 0 at the ingress of the tunnel) to obtain tC+tE+tG. Afterward, network node F adds the time spent by network node F in processing the clock packet (tF=t6−t5) to the outermost processing time correction field of the decapsulated clock packet to obtain tC+tE+tG+tF, where t6 is the time of the packet leaving the IP port of network node F. That is, network node F substitutes tC+tE+tG+tF into the outermost processing time correction field of the decapsulated clock packet (considering that the tunnels at different layers correct the clock only at respective layers when the packet is transmitted through a multi-layer tunnel). In practice, the substitution is not limited to the "outermost" layer of the decapsulated packet, and tC+tE+tG+tF may be substituted into the processing time correction field at any layer of the decapsulated clock packet because the final result is the sum of all layers. In the foregoing process, when the outermost IP header is stripped off from the received clock packet, the outermost Transister-Transister-Logic (TTL) change also needs to be substituted into the inner layer.

Likewise, network node D is a tunnel egress node of TNL1, and also performs the foregoing operations. Therefore, the total time spent by all network nodes in processing the clock packet after the clock packet passes through a two-layer IP tunnel is tC+tE+tG+tF+tD, which is indicated in the innermost processing time correction field.

Clock synchronization of the clock packet transmitted through the tunnel can be implemented through calculation according to symmetry of the path. In this embodiment, the IP clock packet is encapsulated in a way that the IP clock packet is encapsulated into a UDP packet, the processing time correction field of the clock packet after UDP encapsulation is corrected when the clock packet is transmitted through the tunnel, and the clock packet is decapsulated in a way that the clock packet is decapsulated into a UDP packet after the clock packet is transmitted through the tunnel, which implements clock synchronization of the clock packet transmitted through an IP tunnel. Meanwhile, each network node on the tunnel uses itself as a clock reference point when correcting the processing time correction field of the encapsulated clock packet, and all network nodes do not need to synchronize time absolutely, which achieves higher precision of clock synchronization of the clock packet transmitted through the tunnel. Moreover, the method in this embodiment involves few modifications to the existing communication network and the existing clock packet, and is easy to implement.

To improve the clock precision, network nodes C, E, G, F and/or D may correct the frequency of the clock packet by using the frequency correction technology described in section 6.5.4 of the IEEE1588v2 protocol.

In this embodiment, the clock packet may be an IEEE1588v2 clock packet.

Figure 9A:
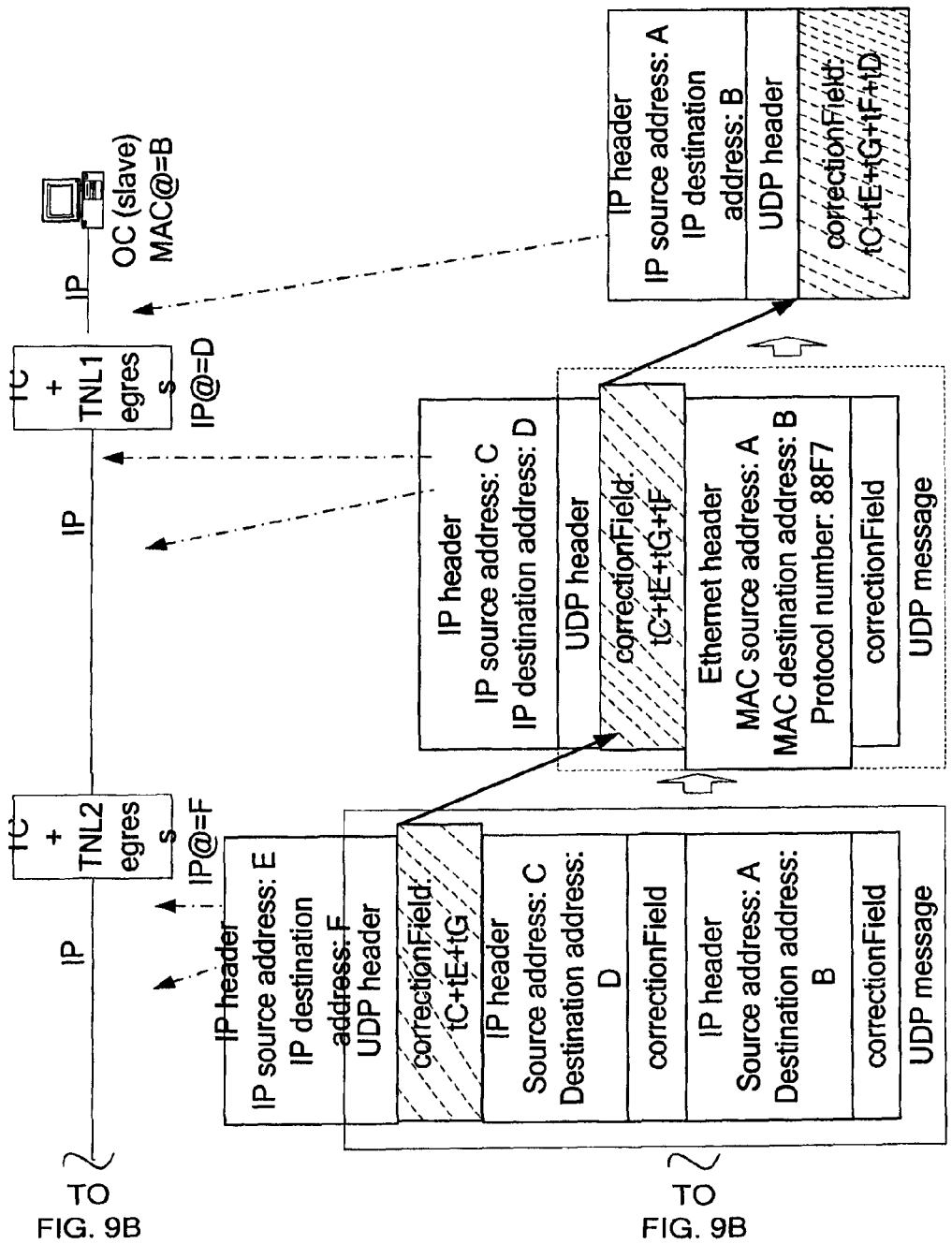
FIG. 9A and FIG. 9B is a schematic diagram of a method for transmitting an IP clock packet through a two-layer IP tunnel by substituting the value of the correction field in the clock packet layer by layer according to an embodiment of the present invention.
Figure 9B:
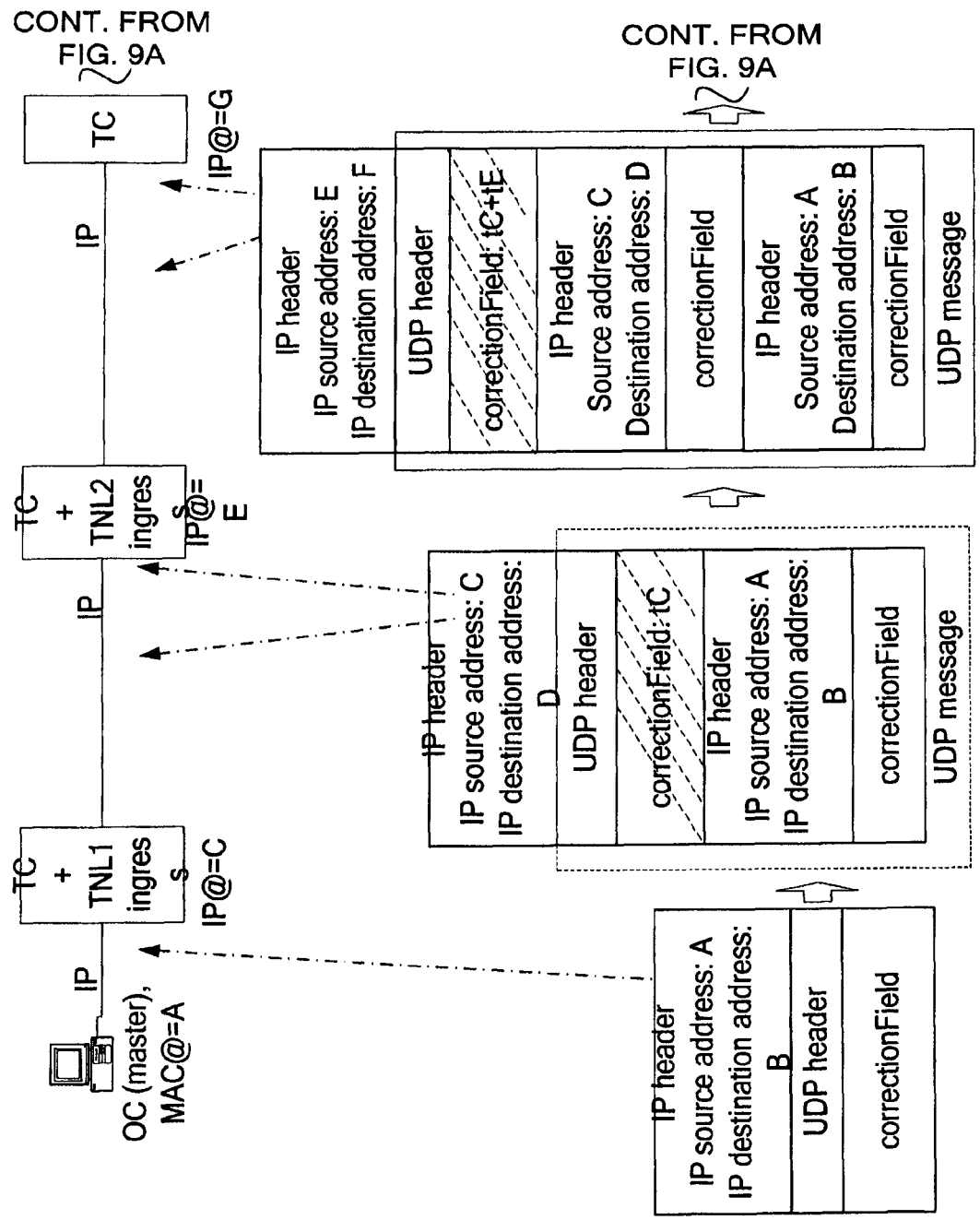

In the foregoing method, the value of the correction field in the clock packet is added layer by layer. The value of the processing time correction field (shadow part) at each layer in FIG. 9A and FIG. 9B is a result of substituting the value of the correction field in the clock packet layer by layer. When the clock packet enters TNL1, tunnel ingress node C substitutes tC into the outermost processing time correction field; when the clock packet enters TNL2, tunnel ingress node E sets tC as an initial value of the outermost processing time correction field of the UDP-encapsulated clock packet, where tC is the value of the outermost processing time correction field of the clock packet that has not been encapsulated in a way that the clock packet is encapsulated into a UDP packet. Tunnel ingress node E performs clock correction for the clock packet, namely, adds the time (tE) spent by this network node in processing the clock packet to the initial value tC to obtain tC+tE, which is the value of the outermost processing time correction field. When the clock packet arrives at intra-tunnel node G, node G performs clock correction for the intra-tunnel clock packet, namely, adds the time (tG) spent by this network node in processing the clock packet to the outermost processing time correction field to obtain tC+tE+tG, which is the value of the outermost processing time correction field. When the clock packet leaves TNL2, tunnel egress node F obtains tC+tE+tG which is the value of the outermost processing time correction field of the clock packet, and adds the time (tF) spent by network node F in processing the clock packet to the foregoing value to obtain tC+tE+tG+tF; and then network node F substitutes tC+tE+tG+tF into the outermost processing time correction field of the decapsulated clock packet. Likewise, when the clock packet leaves TNL1, tunnel egress node D substitutes tC+tE+tG+tF+tD into the outermost processing time correction field. Therefore, this embodiment implements clock synchronization of the clock packet transmitted through multi-layer tunnel.

Figure 10:
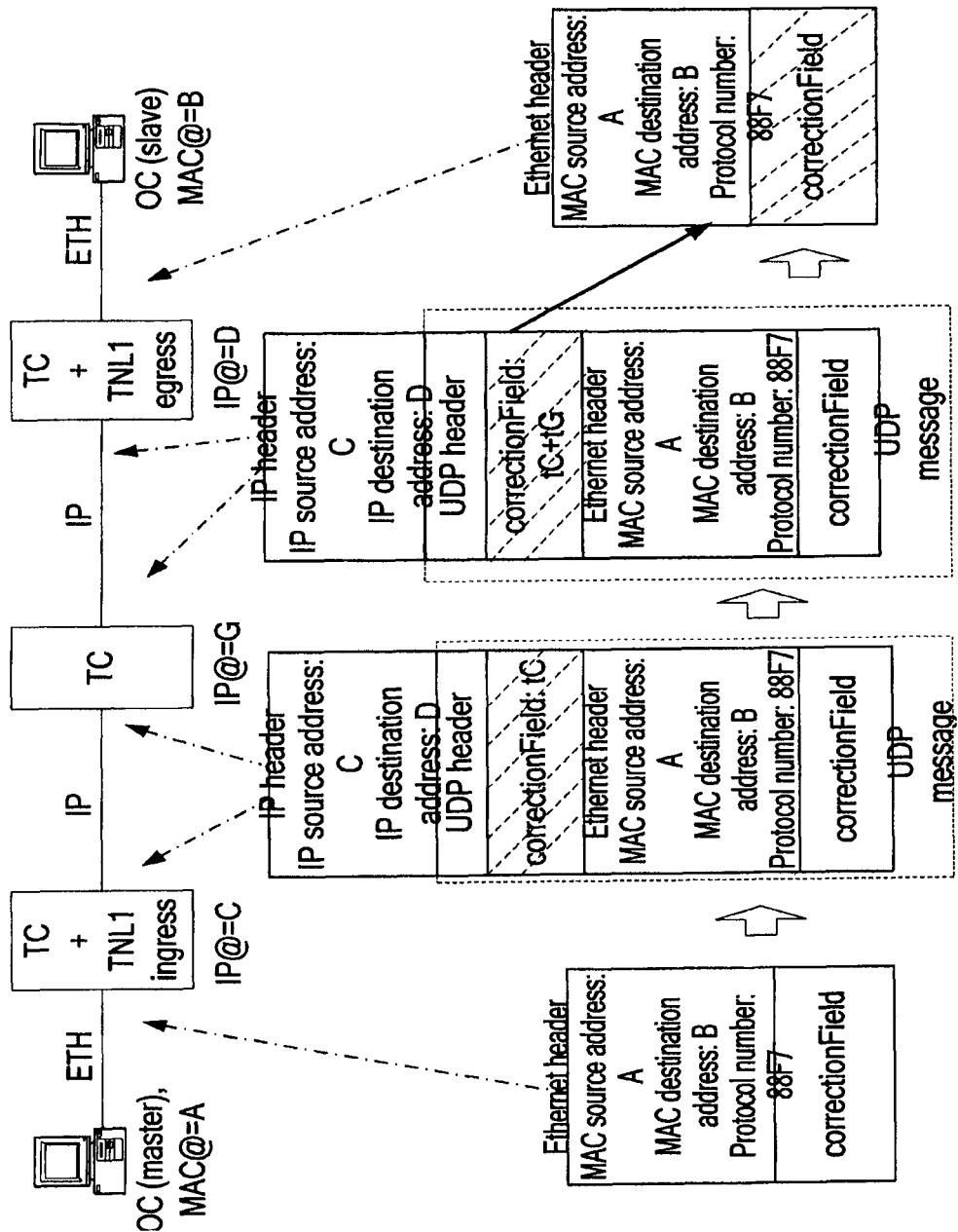
FIG. 10 is a schematic diagram of a method for transmitting an Ethernet clock packet through an IP tunnel according to an embodiment of the present invention.

FIG. 10 is a schematic diagram of a method for transmitting an ETH clock packet through an IP tunnel according to an embodiment of the present invention. That is, FIG. 10 gives an instance of transmitting a clock packet through a tunnel in a heterogeneous network. In the IEEE1588v2 protocol, the BC mode is generally used for transmission in a heterogeneous network. In the BC mode, it is necessary to set up a clock reference point again when the clock packet enters a different type of network, which is rather complicated in controlling clock synchronization. In this embodiment of the present invention, the TC mode is used to transmit the clock packet through a tunnel in a heterogeneous network, which makes it easier to control transmission of the clock packet. Further, in this embodiment, the existing tunnel may be used to transmit the clock packet, or a tunnel dedicated to a clock packet is set up to transmit the clock packet. The tunnel dedicated to a clock packet may be set manually or automatically.

In this embodiment, the method of adding the value of the correction field in the clock packet layer by layer is applied, and the initial value of the processing time correction field of the clock packet at the ingress of the tunnel at each layer is 0. Network node A, namely, master OC (MAC@:A), sends an ETH clock packet (such as a Sync packet in an E2E scenario) to network node B, namely, slave OC (MAC@:B). This clock packet needs to pass through an IP tunnel TNL1 (network node C→network node D). The Delay_Request in the return trip is processed similarly. The shadow part in FIG. 10 is the "processing time correction field" to be processed by each network node. Node C (IP@:C) at the ingress of the tunnel encapsulates the original ETH clock packet in a way that the original ETH clock packet is encapsulated into a UDP packet; node D (IP@:D) at the egress of the tunnel decapsulates the clock packet in a way that the clock packet is decapsulated into a UDP packet, adds the value of the outermost processing time correction field of the non-decapsulated clock packet to the outermost processing time correction field of the decapsulated clock packet, and forwards the clock packet.

Figure 11:
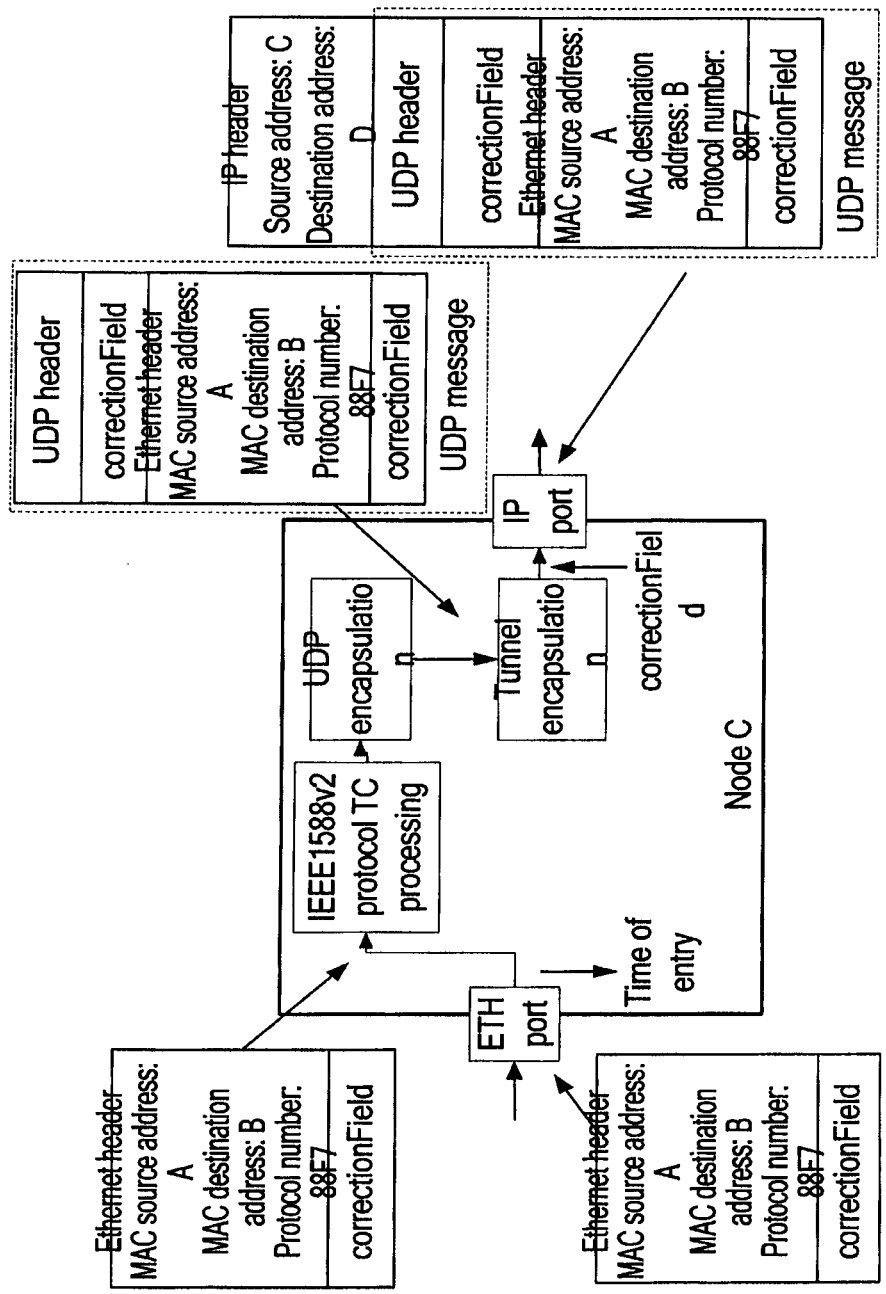
FIG. 11 is a schematic diagram illustrating how a tunnel ingress node processes a clock packet according to an embodiment of the present invention.

As shown in FIG. 11, after receiving the ETH clock packet, node C at the ingress of the IP tunnel determines that the destination address of the clock packet is not this network node itself and determines that the clock packet requires tunneling; therefore, node C determines that the clock packet is a tunnel ingress clock packet (namely, node C is a tunnel ingress node), records the time (t1) of the clock packet entering the ETH port of the tunnel ingress node C, performs TC processing for the clock packet according to the IEEE1588v2 protocol, and encapsulates the clock packet in a way that the clock packet is encapsulated into a UDP packet to obtain a UDP-encapsulated clock packet. Afterward, network node C performs IP tunnel encapsulation for the clock packet, and sends the clock packet out of network node C. Network node C records the time (t2) spent by network node C in processing the clock packet, and modifies the value of the outermost processing time correction field (shadow part in FIG. 10) of the UDP-encapsulated clock packet to tC=t2−t1. The foregoing process may further include the following step: Network node C converts the destination address of the clock packet into the tunnel egress address, and converts the source address into the tunnel ingress address.

After receiving the clock packet, intra-tunnel node G determines that the destination address of the clock packet is not this node itself and determines that the clock packet is an ultra-long clock packet which does not require tunneling; therefore, network node G determines that the received clock packet is an intra-tunnel clock packet (namely, network node G is an IP intra-tunnel node), and modifies the value of the outermost clock correction field of the received clock packet to tC+tG, whereupon the clock packet is output from the IP port of network node G and transmitted further in the tunnel. Similarly, the "outermost" here may be replaced with "any layer".

Figure 12:
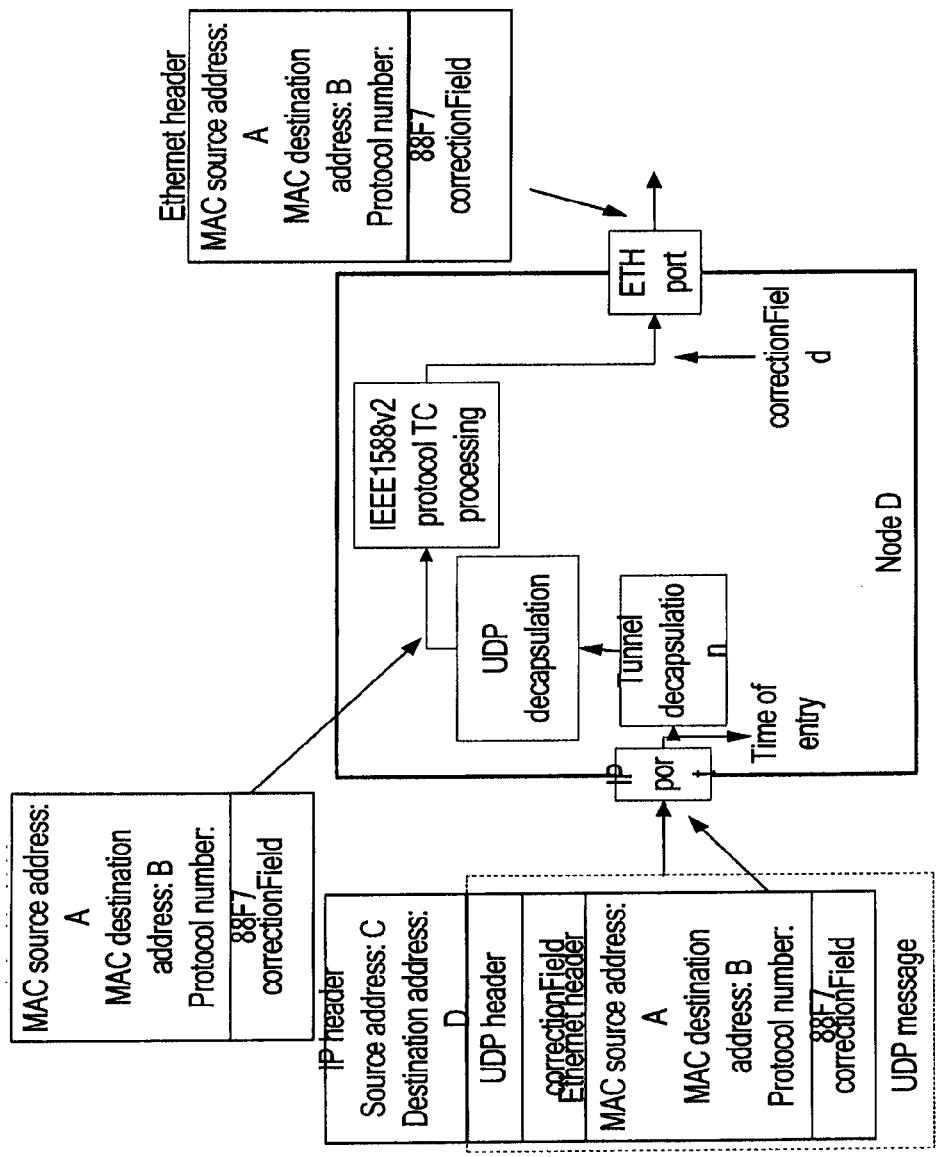
FIG. 12 is a schematic diagram illustrating how a tunnel egress node processes a clock packet according to an embodiment of the present invention.

As shown in FIG. 12, after receiving the clock packet, network node D determines that the destination address of the clock packet is this network node itself and determines that the clock packet is tunneled; therefore, network node D knows that the clock packet is a tunnel egress clock packet, namely, network node D is a tunnel egress node. Network node D records the time (t5) of the clock packet entering the IP port of network node D, and performs tunnel decapsulation first. Network node D adds the value "tE+tG" in the outermost processing time correction field of the non-decapsulated clock packet to the processing time correction field of the decapsulated clock packet to obtain tC+tE+tG. Then network node F adds the time spent by network node F in processing the clock packet (tF=t6−t5) to the outermost processing time correction field of the decapsulated clock packet to obtain tC+tE+tG+tF, where t6 is the time of the clock packet leaving the ETH port of network node F. That is, network node F substitutes tC+tE+tG+tF into the outermost processing time correction field of the decapsulated clock packet. Similarly, the "outermost" here may be replaced with "any layer" of the decapsulated clock packet. In the foregoing process, when the outermost IP header is stripped off the received clock packet, the outermost TTL change also needs to be substituted into the inner layer.

To improve the clock precision, network nodes in this method may correct the frequency of the clock packet by using the frequency correction technology described in section 6.5.4 of the IEEE1588v2 protocol.

In this embodiment, the clock packet may be an IEEE1588v2 clock packet.

Therefore, this embodiment implements clock synchronization of the ETH clock packet transmitted through an IP tunnel and clock synchronization of the clock packet transmitted through a multi-layer tunnel, and implements clock synchronization of the clock packet transmitted through tunnels in a heterogeneous network. Moreover, the method in this embodiment involves few modifications to the existing communication network and clock packet, and is easy to implement.

Figure 13:
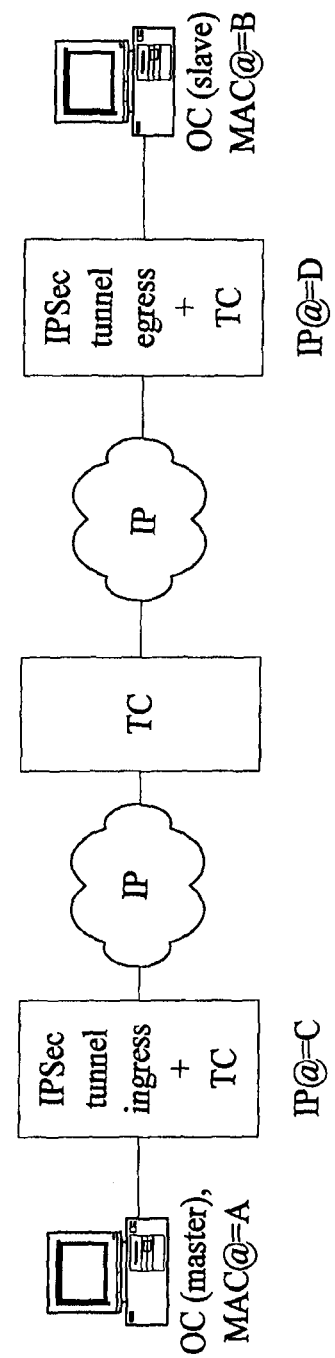
FIG. 13 is a schematic diagram of a method for transmitting a clock packet through an IP Security (IPSec) tunnel according to an embodiment of the present invention.

FIG. 13 is a schematic diagram of a method for transmitting a clock packet through IPSec tunnels according to an embodiment of the present invention.

In the process of implementing the present invention, the inventor finds at least the following problems in the prior art: When a clock packet is transmitted through an IPSec tunnel, the clock packet may be integrity-protected or encrypted; in the case of integrity protection, if the "processing time correction field" is changed in the transmission process, the clock packet is regarded by the terminal as altered, and is discarded by the terminal; in the case of encryption, the processing time correction field cannot be modified because the correction field is unable to reflect the time information after the clock packet is encrypted or decrypted; moreover, when the encrypted clock packet is transmitted in the tunnel, the UDP port number is not 319 any longer and is unidentifiable by the nodes in the tunnel, which makes it impossible to perform clock synchronization for the clock packet transmitted through the IPSec tunnel.

This embodiment of the present invention implements clock synchronization of the clock packet transmitted through an IPSec tunnel, as detailed below:

When the clock packet is a tunnel ingress clock packet, the network node performs UDP encapsulation for the clock packet, performs clock correction for the encapsulated clock packet, and sends the corrected clock packet into the IPSec tunnel for transmission.

When the clock packet is an intra-tunnel clock packet, the network node corrects the correction field of the clock packet, whereupon the corrected clock packet is further transmitted in the IPSec tunnel.

If the clock packet is a tunnel egress clock packet, the network node decapsulates the clock packet and performs clock correction for the decapsulated clock packet.

In this embodiment, the IPSec tunnel may be an encryption tunnel dedicated to a clock packet, or a general data encryption tunnel. The two types of tunnels serve different purposes. The former is dedicated to clock protocol protection and may require the hiding of the IP address and timestamp, and the latter is a channel that encrypts all data.

To improve the clock precision, this method may further include correcting the frequency of the clock packet by using the frequency correction technology described in section 6.5.4 of the IEEE1588v2 protocol.

In this embodiment, the clock packet may be an IEEE1588v2 clock packet.

It can be seen that, this embodiment implements clock synchronization of the clock packet transmitted through IPSec tunnels and clock synchronization of the clock packet transmitted through a multi-layer tunnel, and implements clock synchronization of the integrity-protected or encrypted clock packet transmitted through IPSec tunnels. Moreover, the method in this embodiment involves few modifications to the existing communication network and clock packet, and is easy to implement.

Figure 14:
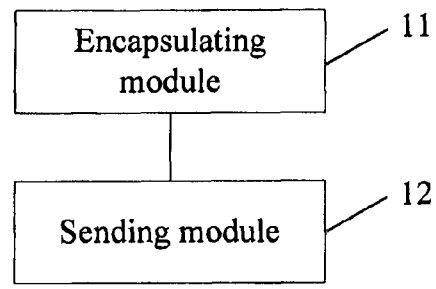
FIG. 14 is a block structural diagram of a network node for processing a clock packet according to an embodiment of the present invention.

FIG. 14 is a block structure diagram of a network node for processing a clock packet according to an embodiment of the present invention. The network node includes:

an encapsulating module 11, configured to encapsulate a received clock packet in an encapsulation mode corresponding to a tunnel if the received clock packet is a tunnel ingress clock packet, and perform clock correction for the encapsulated clock packet; and a sending module 12, configured to send the clock packet processed by the encapsulating module 11 to an egress of the tunnel.

The encapsulation mode corresponding to the tunnel refers to the mode identifiable by the tunnel. For example, when the tunnel is an IP tunnel, the encapsulation mode corresponding to the tunnel refers to UDP encapsulation; when the tunnel is an MPLS tunnel, the encapsulation mode corresponding to the tunnel refers to MPLS encapsulation; when the tunnel is an ETH tunnel, the encapsulation mode corresponding to the tunnel refers to GRE encapsulation. This embodiment of the present invention is not limited to the three tunnels and the corresponding encapsulation modes described above.

Further, the network node provided in this embodiment may include a judging module, which is configured to judge whether the received clock packet is a tunnel ingress clock packet.

Further, the network node provided in this embodiment may include a correcting module, which is configured to perform clock correction for the clock packet if the received clock packet is an intra-tunnel clock packet.

Further, the network node provided in this embodiment may include a decapsulating module, which is configured to decapsulate the clock packet if the received clock packet is a tunnel egress clock packet, and perform clock correction for the decapsulated clock packet.

To improve clock precision, the network node provided in this embodiment may further include a frequency correcting module, which is configured to correct the frequency of the clock packet by using the frequency correction technology described in section 6.5.4 of the IEEE1588v2 protocol.

The network node for processing a clock packet in this embodiment is not only applicable to the scenario of transmitting a clock packet through a single-layer tunnel, but also applicable to the scenario of transmitting a clock packet through a multi-layer tunnel. The network node encapsulates the clock packet by adding the value of the correction field in the clock packet layer by layer, or by substituting the value of the correction field in the clock packet layer by layer, or by other means. Therefore, this embodiment also implements clock synchronization of the clock packet transmitted through a multi-layer tunnel. Meanwhile, each network node on the tunnel uses itself as a clock reference point when correcting the processing time correction field of the encapsulated clock packet, and all network nodes do not need to synchronize time absolutely, which achieves higher precision of clock synchronization of the clock packet transmitted through the tunnel.

In this embodiment, the clock packet may be an IEEE1588v2 clock packet.

In this embodiment of the present invention, the clock packet may be but not limited to: IP clock packet, ETH clock packet, and MPLS clock packet; and the tunnel may be but not limited to: IP tunnel, ETH tunnel, MPLS tunnel, or IPSec tunnel.

The method for transmitting a clock packet through a tunnel in this embodiment of the present invention is applicable to both homogeneous networks and heterogeneous networks. Therefore, this embodiment also implements clock synchronization of a clock packet transmitted through tunnels in a heterogeneous network. The network node provided in this embodiment is also applicable in IPSec tunnels to implement clock synchronization of a clock packet transmitted through IPSec tunnels.

The method for transmitting a clock packet through a tunnel in this embodiment of the present invention is applicable to both the scenario of transmitting a clock packet through an existing tunnel and the scenario of transmitting a clock packet through a tunnel dedicated to the clock packet.

Figure 15:
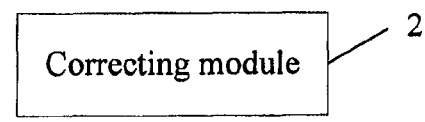
FIG. 15 is a block structural diagram of a network node for processing a clock packet according to an embodiment of the present invention.

FIG. 15 is a block structural diagram of a network node for processing a clock packet according to an embodiment of the present invention. The network node includes:

a correcting module 2, configured to perform clock correction for a clock packet if the received clock packet is an intra-tunnel clock packet.

The intra-tunnel clock packet is a clock packet encapsulated in a mode identifiable by the tunnel at the ingress of the tunnel.

The clock correction performed by the correcting module 2 for the clock packet is as follows: The correcting module 2 adds the time spent in processing the clock packet to a processing time correction field of the clock packet, for example, to the outmost processing time correction field of the clock packet. The processing time includes the time spent by the network node in transmitting the clock packet transparently.

Further, the network node provided in this embodiment may include a judging module, which is configured to judge whether the received clock packet is an intra-tunnel clock packet.

Further, the network node provided in this embodiment may include: an encapsulating module, configured to encapsulate the received clock packet in an encapsulation mode corresponding to the tunnel if the received clock packet is a tunnel ingress clock packet, and perform clock correction for the encapsulated clock packet; and a sending module, configured to send the clock packet processed by the encapsulating module to the egress of the tunnel.

Further, the network node provided in this embodiment may include a decapsulating module, which is configured to decapsulate the clock packet if the received clock packet is a tunnel egress clock packet, and perform clock correction for the decapsulated clock packet.

To improve clock precision, the network node provided in this embodiment may further include a frequency correcting module, which is configured to correct the frequency of the clock packet by using the frequency correction technology described in section 6.5.4 of the IEEE 1588v2 protocol.

The network node for processing a clock packet in this embodiment is not only applicable to the scenario of transmitting a clock packet through a single-layer tunnel, but also applicable to the scenario of transmitting a clock packet through a multi-layer tunnel. The network node corrects the clock packet by adding the value of the correction field in the clock packet layer by layer, or by substituting the value of the correction field in the clock packet layer by layer, or by other means. Therefore, this embodiment also implements clock synchronization of the clock packet transmitted through a multi-layer tunnel. Meanwhile, each network node on the tunnel uses itself as a clock reference point in the subsequent clock correction, and all network nodes do not need to synchronize time absolutely, which achieves higher precision of clock synchronization of the clock packet transmitted through the tunnel.

In this embodiment, the clock packet may be an IEEE1588v2 clock packet.

In this embodiment of the present invention, the clock packet may be but not limited to: IP clock packet, ETH clock packet, and MPLS clock packet; and the tunnel may be but not limited to: IP tunnel, ETH tunnel, MPLS tunnel, and IPSec tunnel.

The method for transmitting a clock packet through a tunnel in this embodiment of the present invention is applicable to both homogeneous networks and heterogeneous networks. Therefore, this embodiment also implements clock synchronization of a clock packet transmitted through tunnels in a heterogeneous network. The network node provided in this embodiment is also applicable in IPSec tunnels to implement clock synchronization of a clock packet transmitted through IPSec tunnels.

The method for transmitting a clock packet through a tunnel in this embodiment of the present invention is applicable to both the scenario of transmitting a clock packet through an existing tunnel and the scenario of transmitting a clock packet through a tunnel dedicated to the clock packet.

Figure 16:
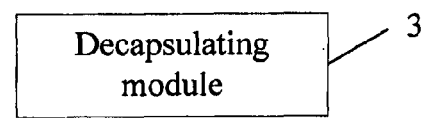
FIG. 16 is a block structural diagram of a network node for processing a clock packet according to an embodiment of the present invention.

FIG. 16 is a block structural diagram of a network node for processing a clock packet according to an embodiment of the present invention. The network node includes:

a decapsulating module 3, configured to decapsulate a clock packet if the received clock packet is a tunnel egress clock packet, and perform clock correction for the decapsulated clock packet.

Further, the network node provided in this embodiment may also include a judging module, which is configured to judge whether the received clock packet is a tunnel egress clock packet.

Further, the network node provided in this embodiment may also include: an encapsulating module, configured to encapsulate the received clock packet in an encapsulation mode corresponding to the tunnel if the received clock packet is a tunnel ingress clock packet, and perform clock correction for the encapsulated clock packet; and a sending module, configured to send the clock packet processed by the encapsulating module to the egress of the tunnel.

Further, the network node provided in this embodiment may also include a correcting module, which is configured to perform clock correction for the clock packet if the received clock packet is an intra-tunnel clock packet.

To improve clock precision, the network node provided in this embodiment may further include a frequency correcting module, which is configured to correct the frequency of the clock packet by using the frequency correction technology described in section 6.5.4 of the IEEE1588v2 protocol.

The network node for processing a clock packet in this embodiment is not only applicable to the scenario of transmitting a clock packet through a single-layer tunnel, but also applicable to the scenario of transmitting a clock packet through a multi-layer tunnel. The network node decapsulates the clock packet by adding the value of the correction field in the clock packet layer by layer, or by substituting the value of the correction field in the clock packet layer by layer, or by other means. Therefore, this embodiment also implements clock synchronization of the clock packet transmitted through a multi-layer tunnel. Meanwhile, each network node on the tunnel uses itself as a clock reference point in the subsequent clock correction, and all network nodes do not need to synchronize time absolutely, which achieves higher precision of clock synchronization of the clock packet transmitted through the tunnel.

In this embodiment, the clock packet may be an IEEE1588v2 clock packet.

In this embodiment of the present invention, the clock packet may be but not limited to: IP clock packet, ETH clock packet, and MPLS clock packet; and the tunnel may be but not limited to: IP tunnel, ETH tunnel, MPLS tunnel, and IPSec tunnel.

The method for transmitting a clock packet through a tunnel in this embodiment of the present invention is applicable to both homogeneous networks and heterogeneous networks. Therefore, this embodiment also implements clock synchronization of a clock packet transmitted through tunnels in a heterogeneous network. The network node provided in this embodiment is also applicable in IPSec tunnels to implement clock synchronization of a clock packet transmitted through IPSec tunnels.

The method for transmitting a clock packet through a tunnel in this embodiment of the present invention is applicable to both the scenario of transmitting a clock packet through an existing tunnel and the scenario of transmitting a clock packet through a tunnel dedicated to the clock packet.

Figure 17:
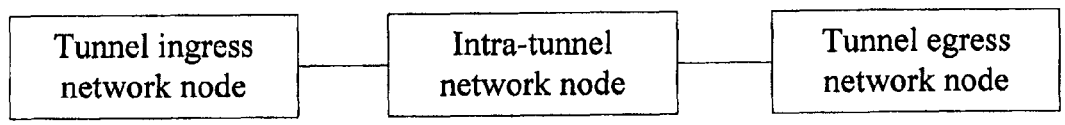
FIG. 17 is a schematic diagram of a communication system for processing a clock packet according to an embodiment of the present invention.

As shown in FIG. 17, a communication system for processing a clock packet in an embodiment of the present invention includes:

a tunnel ingress network node, configured to: encapsulate a received clock packet in an encapsulation mode corresponding to a tunnel if the received clock packet is a tunnel ingress clock packet, perform clock correction for the encapsulated clock packet, and send the clock packet encapsulated to the egress of the tunnel;

an intra-tunnel network node, configured to perform clock correction for the received clock packet if the received clock packet is an intra-tunnel clock packet; and a tunnel egress network node, configured to decapsulate the clock packet if the received clock packet is a tunnel egress clock packet, and perform clock correction for the decapsulated clock packet.

The intra-tunnel clock packet is a clock packet encapsulated in a mode identifiable by the tunnel at the ingress of the tunnel.

In this embodiment, one or more intra-tunnel network nodes may exist; as regards a single-layer tunnel, it is appropriate that one tunnel ingress network node and one tunnel egress network node exist; as regards multi-layer tunnel, it is appropriate that multiple tunnel ingress network nodes and multiple tunnel egress network nodes exist, and the clock packet may pass through the ingress network node or intra-tunnel network node of the tunnel at one layer, and then pass through the ingress network node of the tunnel at another layer.

The clock packet is encapsulated in the encapsulation mode corresponding to the tunnel, the encapsulated clock packet is corrected when the clock packet is transmitted through the tunnel, and all network nodes do not need to synchronize time absolutely in the subsequent process. Thereby, when the clock packet is transmitted through the tunnel, clock synchronization is implemented, and the precision of clock synchronization is higher.

The implementation of the apparatus or system above may involve the process of judging whether the clock packet is a tunnel ingress clock packet, or an intra-tunnel clock packet, or a tunnel egress clock packet. For the detailed judging method, see the method embodiment above.

Persons of ordinary skill in the art should understand that all or a part of the steps of the method specified in any embodiment above may be implemented by a program instructing relevant hardware. The program may be stored in a computer readable storage medium such as a Read Only Memory or Random Access Memory (ROM/RAM), a magnetic disk or a Compact Disk-Read Only Memory (CD-ROM). When the program runs, the program performs all or a part of the steps described above.

The above descriptions are merely some exemplary embodiments of the present invention, but not intended to limit the scope of the present invention. Any modification, equivalent replacement, or improvement made without departing from the spirit and principles of the present invention shall fall within the protection scope of the present invention.

What is claimed is:

1. A method for transmitting a clock packet through a tunnel, wherein the clock packet comprises a processing time correction field of the clock packet, the method comprising:
   encapsulating a tunnel ingress clock packet received at an ingress of the tunnel, in an encapsulation mode corresponding to the tunnel comprising: setting an initial value of an outermost processing time correction field of the clock packet, generating a new clock packet, appending the received clock packet to the new clock packet, and encapsulating the new clock packet and the original clock packet in the encapsulation mode corresponding to the tunnel;
   performing clock correction for the encapsulated clock packet;
   sending the corrected clock packet to an egress of the tunnel; and
   decapsulating the clock packet at the egress of the tunnel, wherein decapsulating the clock packet at the egress of the tunnel comprises:
   decapsulating the clock packet, stripping off the new clock packet, subtracting the initial value of the outermost processing time correction field from a value of the outermost processing time correction field of the non-decapsulated clock packet, and adding a result of the subtraction to the processing time correction field of the decapsulated clock packet.

2. The method according to claim 1, wherein the method comprises at least one of:
   performing clock correction for an intra-tunnel clock packet in the tunnel; and decapsulating a tunnel egress clock packet at the egress of the tunnel, and performing clock correction for the decapsulated clock packet.

3. The method according to claim 1, wherein the method further comprises: determining whether the received clock packet is a tunnel ingress clock packet, wherein the determining comprises:
   if a destination address of the received clock packet is not a node that receives the clock packet, judging whether the clock packet requires tunneling; if the clock packet requires tunneling, determining that the clock packet is a tunnel ingress clock packet.

4. The method according to claim 1, wherein:
types of the clock packet comprise at least one of: Internet Protocol (IP) clock packet, Ethernet (ETH) clock packet, and Multi-Protocol Label Switching (MPLS) clock packet.

5. The method according to claim 1, wherein:
types of the tunnel comprise at least one of: IP tunnel, ETH tunnel, MPLS tunnel, and IP Security (IPSec) tunnel.

6. The method according to claim 1, wherein:
the tunnel is one of a single-layer tunnel or multi-layer tunnel.

7. A network node for processing a clock packet, comprising:
an encapsulating module, configured to encapsulate a received clock packet in an encapsulation mode corresponding to a tunnel if the received clock packet is a tunnel ingress clock packet, and perform clock correction for the encapsulated clock packet and to set an initial value of an outermost processing time correction field of the clock packet, generate a new clock packet, append the received clock packet to the new clock packet, and encapsulate the new clock packet and the original clock packet in the encapsulation mode corresponding to the tunnel; and
a sending module, configured to send the clock packet processed by the encapsulating module to an egress of the tunnel; and
a decapsulating module, configured to decapsulate the clock packet if the received clock packet is a tunnel egress clock packet, and perform clock correction for the decapsulated clock packet; and wherein the decapsulating module comprises a module, and wherein: the module is configured to decapsulate the clock packet, strip off the new clock packet, subtract an initial value of an outermost processing time correction field from a value of the outermost processing time correction field of the non-decapsulated clock packet, and add a result of the subtraction to the processing time correction field of the decapsulated clock packet.

8. The network node according to claim 7, further comprising:
a judging module, configured to determine whether the received clock packet is a tunnel ingress clock packet.

9. The network node according to claim 8, wherein the judging module further configured to determine whether the clock packet requires tunneling, if a destination address of the received clock packet is not the network node itself; determine that the clock packet is a tunnel ingress clock packet, if the clock packet requires tunneling.

10. The network node according to claim 7, wherein the network node further comprises:
a correcting module, configured to perform clock correction for the clock packet if the received clock packet is an intra-tunnel clock packet.

11. A communication system for processing a clock packet, comprising the network node specified in claim 7, and further comprising:
an intra-tunnel network node, configured to perform clock correction for a received clock packet if the received clock packet is an intra-tunnel clock packet; and
a tunnel egress network node, configured to decapsulate the clock packet if the received clock packet is a tunnel egress clock packet, and perform clock correction for the decapsulated clock packet.

\* \* \* \* \*